(12) United States Patent
Yang

(10) Patent No.: US 7,475,611 B2
(45) Date of Patent: Jan. 13, 2009

(54) DEVICE FOR EXTERNALLY ROTARY DRIVE OF OFFSET MOTOR

(76) Inventor: Tai-Her Yang, No. 59, Chung Hsiao 8 St., Si-Hu Town, Dzan-Hwa (TW)

( * ) Notice: Subject to any disclaimer, the term of this patent is extended or adjusted under 35 U.S.C. 154(b) by 0 days.

(21) Appl. No.: 10/108,378

(22) Filed: Mar. 29, 2002

(65) Prior Publication Data

US 2003/0183034 A1   Oct. 2, 2003

(51) Int. Cl.
*B60K 1/02* (2006.01)
(52) U.S. Cl. .................. 74/413; 74/421 A; 180/65.5; 476/64; 476/65
(58) Field of Classification Search .............. 74/68, 74/409, 413, 421 A; 476/61, 64, 65, 66; 180/65.5; 310/75 C; 108/20
See application file for complete search history.

(56) References Cited

U.S. PATENT DOCUMENTS

| | | | | |
|---|---|---|---|---|
| 1,172,456 | A | * | 2/1916 | Hoadley ............... 310/67 R |
| 1,246,823 | A | * | 11/1917 | Shelton ................. 476/64 |
| 1,269,752 | A | * | 6/1918 | Shelton ................. 476/64 |
| 1,383,602 | A | * | 7/1921 | Corning ................. 476/64 |
| 2,118,347 | A | * | 5/1938 | Hardenberg ............ 226/169 |
| 2,337,863 | A | * | 12/1943 | Beeler ................. 416/170 R |
| 2,467,261 | A | * | 4/1949 | Hobrough .............. 192/223 |
| 2,711,057 | A | * | 6/1955 | Magnus ................. 476/64 |
| 3,033,049 | A | * | 5/1962 | Morrow ................. 476/64 |
| 3,265,147 | A | * | 8/1966 | Coordes ................. 180/62 |
| 3,796,105 | A | * | 3/1974 | Menard ................. 476/64 |
| 3,908,776 | A | * | 9/1975 | Dudley ................ 180/65.5 |
| 4,754,658 | A | * | 7/1988 | Gutknecht ............. 476/64 |
| 5,560,442 | A | * | 10/1996 | Canderle .............. 180/65.5 |
| 5,732,786 | A | * | 3/1998 | Fujigaki ............... 180/19.3 |
| 6,148,942 | A | * | 11/2000 | Mackert, Sr. .......... 180/65.6 |
| 6,321,863 | B1 | * | 11/2001 | Vanjani ................ 180/65.5 |

FOREIGN PATENT DOCUMENTS

DE            196 35 808        *   3/1998

* cited by examiner

*Primary Examiner*—William C Joyce
(74) *Attorney, Agent, or Firm*—Rabin & Berdo, P.C.

(57) ABSTRACT

A Device for Externally Rotary Drive of Offset Motor, comprising: external rotary assembly, offset Means, drive motor and transmission means; the external rotary assembly carries the hub to rotation by a central shaft immobilized in line with an offset means fixed internally to the hub, on the offset means is quipped a drive motor whereof the output shaft terminal incorporates a transmission means to drive the hub, whereby the drive motor carries the external rotary assembly.

2 Claims, 23 Drawing Sheets

DEVICE FOR EXTERNALLY ROTARY DRIVE OF OFFSET MOTOR

BACKGROUND OF THE INVENTION (a) Field of the Invention

Design of Device for Externally Rotary Drive of Offset Motor, more specifically it relates to such a design of offset motor which allows for incorporation of the motor in an external rotary assembly to render advantages including: deceleration, increased torque of transmission, and these accounting for an internal mode of transmission subserving to promote transmission efficiencies.

(b) Description of the Prior Art

In a conventional design of reduced transmissions, the rule is unexceptionally to have power generated by an external drive belt or transmission chain conveyed to the load, as such both the torque of transmission and transmission efficiency are grossly impaired in the conveying process, the alternative to have the drive motor equipped directly with transmission means, may help to reduce transmission loss admittedly, still, due to the limited torque output inherent with the drive motor, that will mean limited overall torque output, all the same.

SUMMARY OF THE INVENTION

Device for Externally Rotary Drive of Offset Motor, comprising: external rotary assembly, offset means, drive motor and transmission means; the external rotary assembly is complete with a hub centrally fitted with a shaft to make it rotatable, which carries in turn an offset means not in line with it, the said offset means being furnished with one or more drive motor, also out of alignment with said shaft, on the output shaft end of the drive motor is mounted a primary gear or friction wheel which gives moment to transmission, in said hub are mounted follower internal ringed gear or internal ringed friction wheel which are made in contact with aforementioned primary gear or friction wheel to thereby achieve actuation of the external rotary drive assembly and by the motor thus driven to transmission, the dislocation design serves also to adjust the axial clearance between the primary gear or friction wheel and the follower internal ringed gear or internal ringed friction wheel, and that redounding to the setting of speed ratio and facilitating the placement of more than one motor as justified on a case by case basis, in view of an increase in torque of transmission and transmission efficiency as well.

DETAILED DESCRIPTION OF THE PREFERRED EMBODIMENTS

Figure 1:
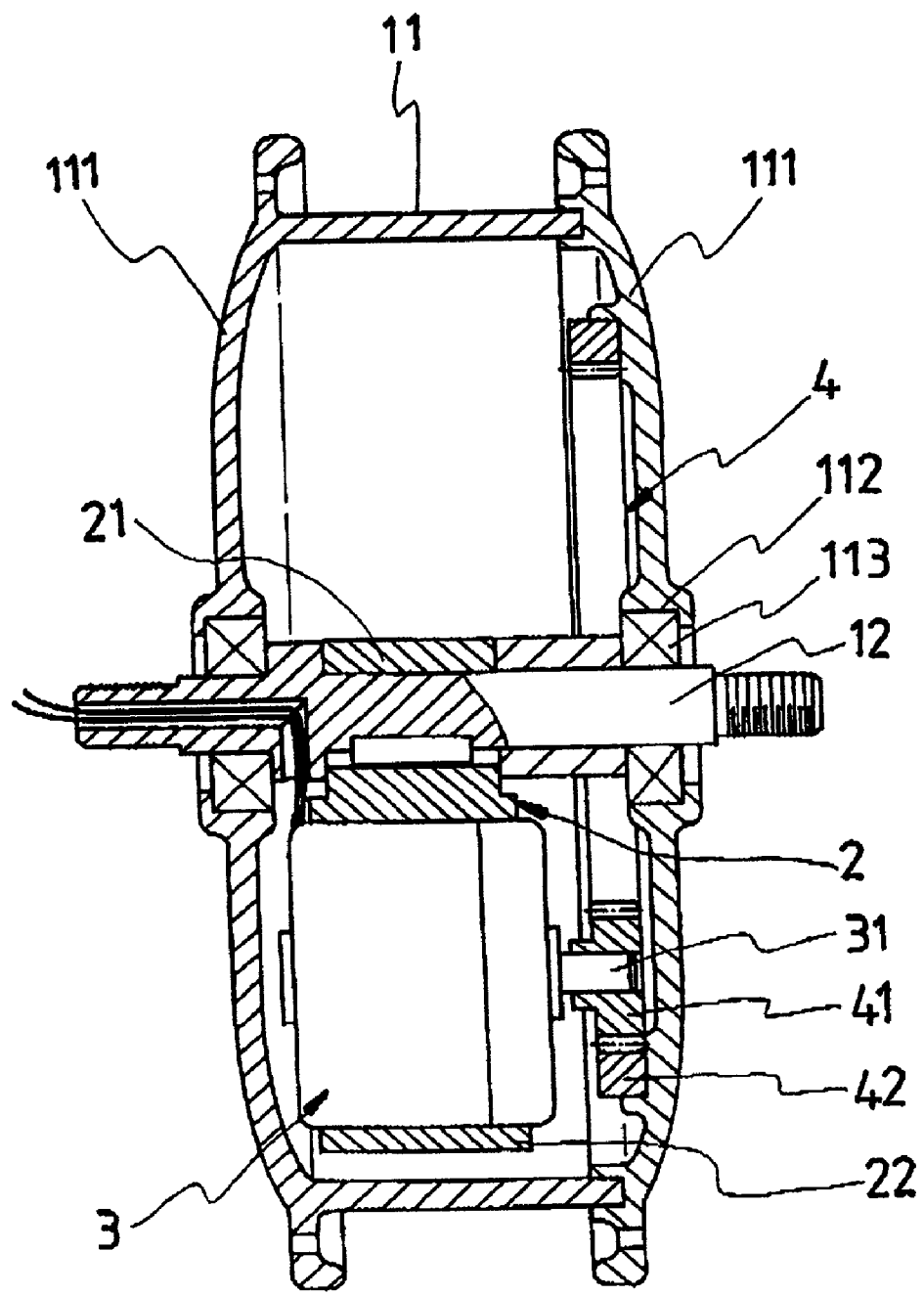
FIG. 1 is a frontal elevation of the invention device for single drive motor with single side gear transmission executed in one embodiment.

The essential purpose of the invention is to provide structural design of a Device for Externally Rotary Drive of offset Motor comprising essentially: external rotary assembly, offset means, drive motor and transmission means; the external rotary assembly is built with a hub which is made rotatable by a fix shaft centrally integral therewith, and said fix shaft is in line with an offset means not concentric with it, mounted inside, onto said offset means is or are mounted one or more drive motor deflected from the axis of said fix shaft, on the output shaft end of the drive motor is mounted prime gear or friction wheel which makes for the transmission means, in the hub are provided follower internal ringed gear or internal ringed friction wheel, and these made in contact with said follower internal ringed gear or internal ringed friction wheel, thereby achieving actuation of the external rotary assembly by the drive motor, the dislocation design is meant to adjust the axial clearance way between the prime gear or friction wheel and the follower internal ringed gear or internal ringed friction wheel, so as to facilitate setting of speed ratio, as well as to accommodate the placement of one or more motor as needed in an effort to increase torque of transmission and transmission efficiency.

The hub may include a pair of radial flanges each provided with a plurality of through-holes aligned with axis of the hub, optionally with pairs of the holes in the two flanges aligned with the axis of the hub.

A further feature of the invention lies with design of Device for Externally Rotary Drive of Offset Motor whereof the offset means is configured in a bent arm and reserved with adjustable resilience, what with the drive motor arranged on the bent arm side the friction wheel may be driven to transmit in turn the internal ringed friction wheel, and that carrying the external rotary assembly whereby output of a relatively higher torque is made possible and a better efficiency is procured by the working of the internal ringed friction wheel system, and all that making possible a free adjustment of the preserved pressure in the external rotary assembly to meet all forms of applications.

A further feature of the invention lies in the provision of a rotary transmission assembly external to a offset motor with exposed rotor parts, whereby friction wheel or annularly arranged gear composed of frictional material, interconnected straight to peripheral ring of motor rotor, once driven to rotation in conjunction with ambient stator, will bring the internal ringed transmission friction wheel or gear external of the rotary assembly to entrain the external rotary assembly altogether.

Figure 2:
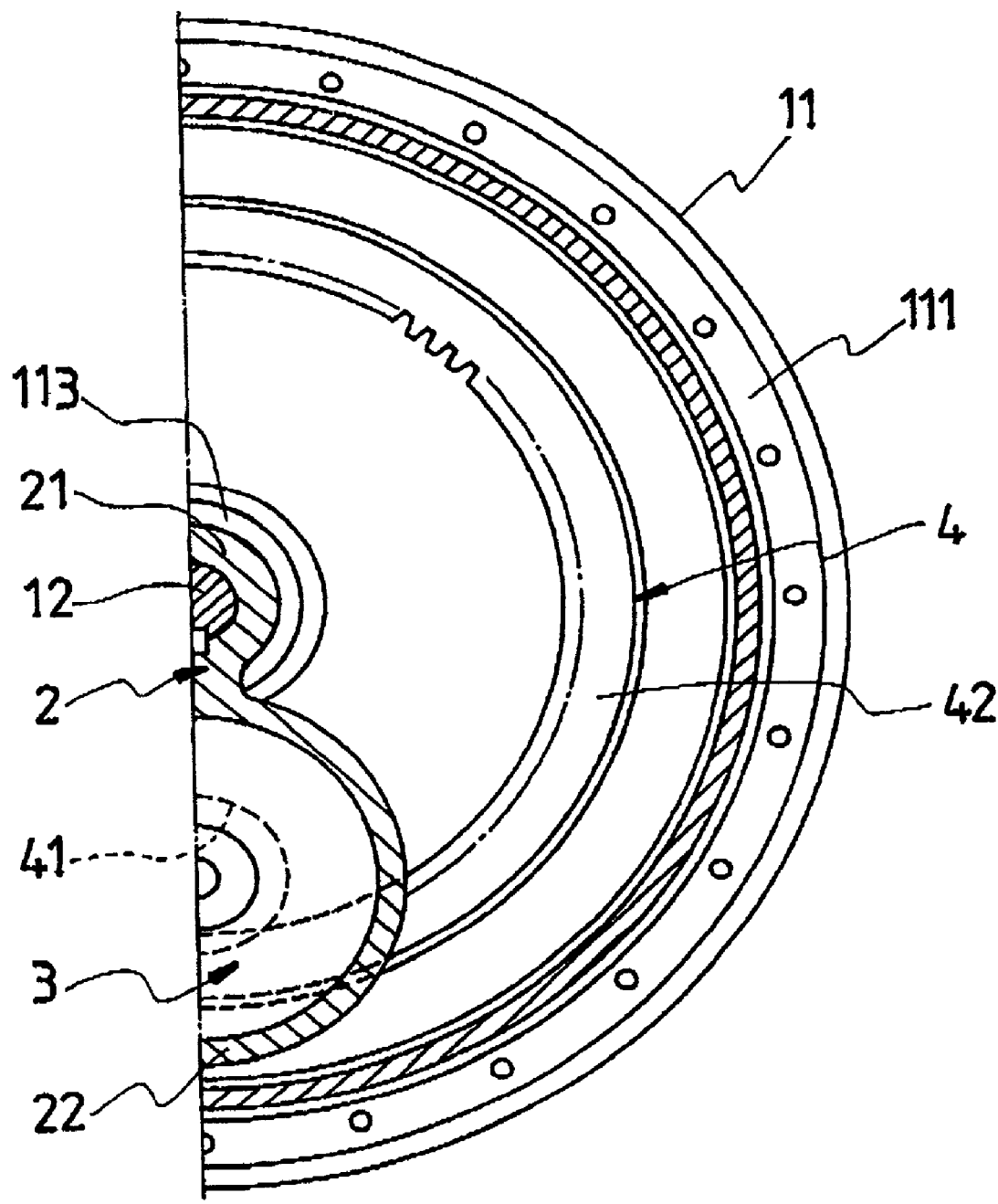
FIG. 2 is a partially taken side view of the embodiment of the device for single drive motor with single side gear transmission executed ditto.
Figure 3:
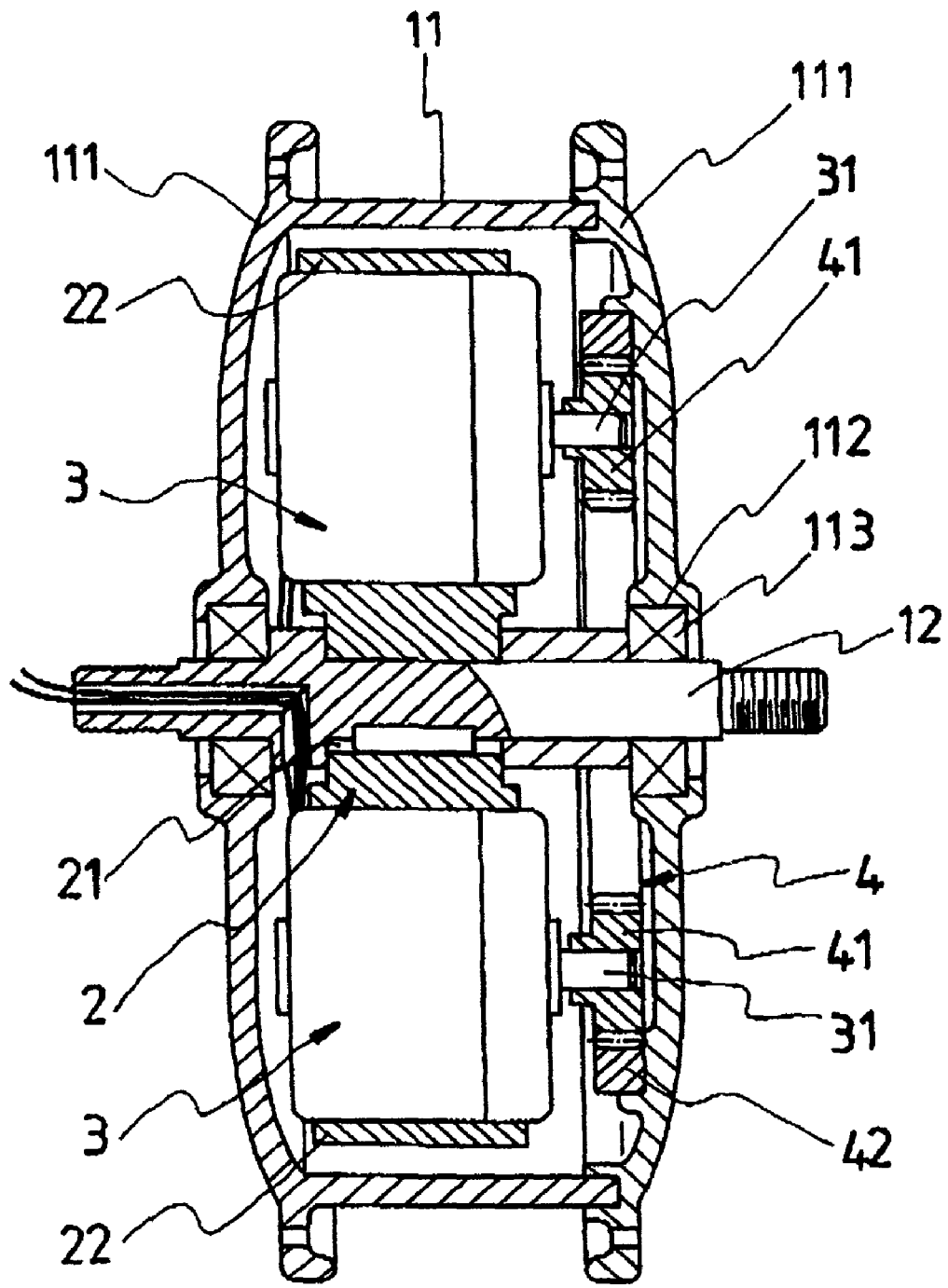
FIG. 3 is a frontal elevation of the invention device for multiple drive motor with single side gear transmission executed in one embodiment.
Figure 4:
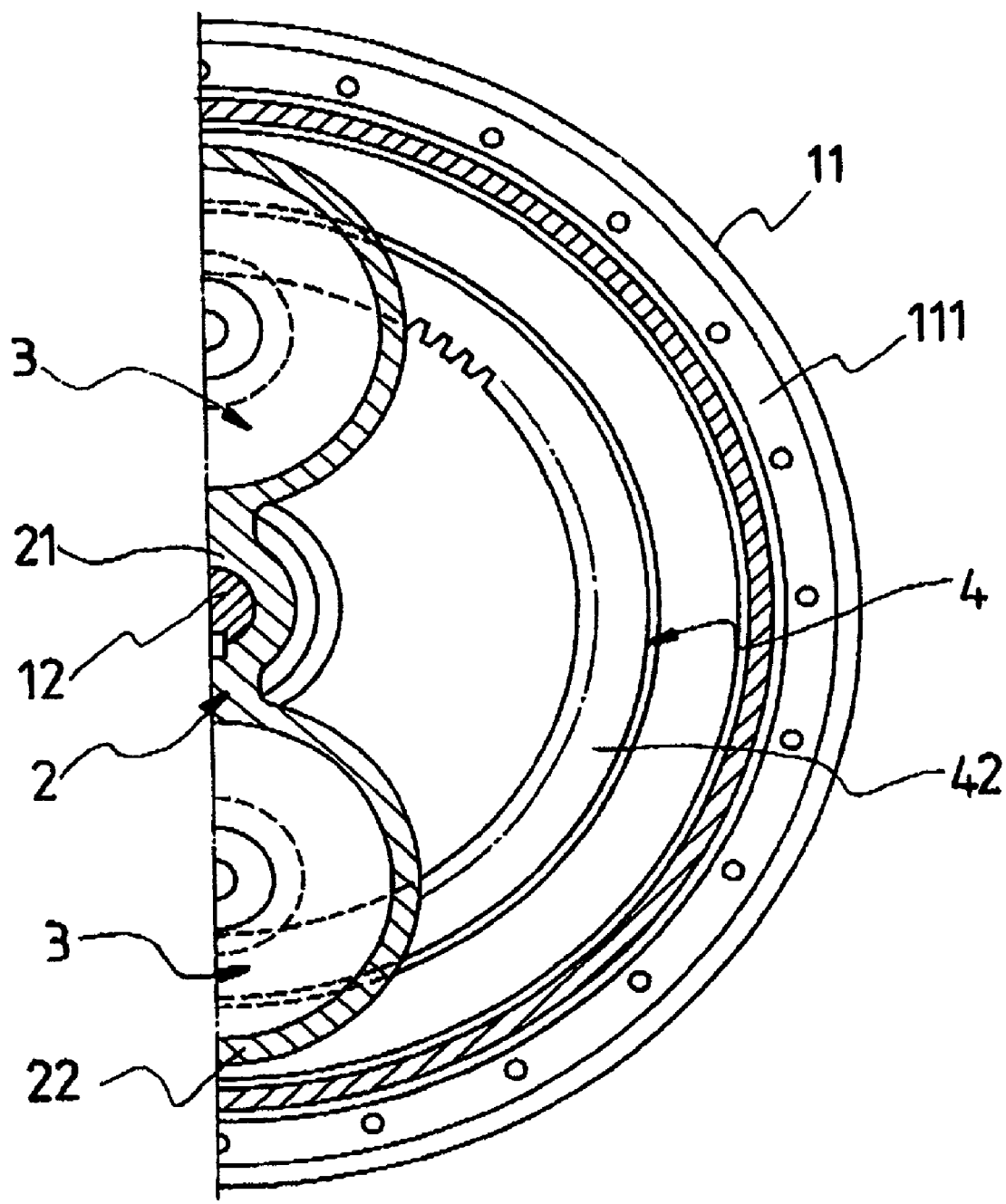
FIG. 4 is a partially taken side view of the embodiment for multiple drive motor with single side gear transmission executed ditto.

Other objects, structural characteristics of the invention will emerge evident on appreciation of preferred embodiments described with reference to the accompanying drawings in which FIG. 1 through FIG. 4 illustrate altogether a design according to the invention, of Device for Externally Rotary Drive of Offset Motor which comprises essentially: an external rotary assembly, offset means 2, drive motor 3 and transmission means 4, more specifically:

the external rotary assembly, as shown in FIG. 1, is executed in the form of a hollow-set hub 11, composed of two shell halves 111, internally concave, symmetric or asymmetric, or alternatively composed of two disk shells complemented with two hollow-set cylinders, each shell 111 penetrated with an axial hole 112 across the center, and each axial hole 112 planted with a bearing 113 so that a pair of same 113 gives seat to a fix shaft 12 spanning about both, with both ends of the fix shaft 12 mounted elsewhere to ensure that the hub 11 formed from the pair of shell 111 will be driven to run in rotation alongside the fix shaft 12 as desired;

the offset means 2, as shown in FIG. 1 and FIG. 2, is executed by having one end thereof bonded straight to the fix shaft 12 or attached with a coupling means 21, for coupling to the fix shaft 12 which is meant for concentric coupling to the external rotary assembly, further, on the offset means 2 is mounted a fitting 22 to accommodate the drive motor 3; or alternatively, as illustrated in FIG. 3, FIG. 4, the offset means 2 may have itself, by the center, coupled straight to the fix shaft 12, or, in a variant execution, have itself coupled physically to the fix shaft 12 by way of a coupling means 21, whereas the terminating portion of the radially extending structure accommodates the fitting 22 for the drive motor 3, said fitting 22 attached to the external end of the aforementioned offset means 2 may be provided singly or plurally, to accommodate one or more dislocated drive motor 3, for example, three or four such dislocated drive motors 3, to be determined to meet actualities on a case by case basis;

the drive motor 3, composed of rotor and stator elements, whereby electric energy may be converted to rotary power, is executed in either D.C. type or A.C. type, with or without armature brushes, of synchronous, asynchronous, or step mode, to be employed in service of needs foreseen pursuant to the invention;

the transmission means 4, such as is shown in FIG. 1 through FIG. 4, is composed of driving gear 41 together with driven internal ring gear 42, the internal ringed gear 42 being circularly configured and having engageable teeth processed onto the wall of the configured layout, to facilitate transmission by gear 41 and carrying of the internal ringed gear 42 to reduced transmission purposes;

Structured accordingly, as illustrated in FIG. 1 and FIG. 2, as evident from the aforementioned external rotary assembly, the body of the fix shaft 12 that sets in concentric alignment with the hub 11, and rests within the hub 11, may be incorporated direct to the offset means 2 or alternatively attached thereto by way of a coupling means 21, so that the offset means 2 and the fix shaft 12 are both eccentrically fixed unto the hub 11, also, by the drive motor 3 positioned on the fitting 22 external to the offset means 2, in conjunction with gear 41 of the transmission means 4 positioned on the terminating end of the output shaft of the drive motor 3, the internal ringed gear 42 processed straight in the hub 11 of the external rotary assembly, or the internal ringed gear 42 of the transmission means 4 duly coupled, the gear 41 may be brought into engagement with the internal ringed gear 42, as a variant execution where needed the transmission motor 3 may be positioned by being deviated underneath the interiority of the hub 11 of the external rotary assembly so that the center of gravitation is maintained down underneath to redound to its stability, meanwhile that makes possible the transmission means 4 carrying the external rotary assembly to transmission straight; next, as illustrated in FIG. 3 and FIG. 4, according to the invention, where needed, the offset means 2 may be coupled direct to the fix shaft 12, or may have itself, by way of the coupling means 21 central thereof, attached to the body of the fix shaft 12, and further, drive motor 3 may be furnished on the fitting 22 that is being radially extended so as to have a transmission gear 41 provided on the terminating end of the output shaft of the drive motor 3 so that said gear 41 is made engaged with internal ringed gear 42 that is positioned on a chosen side in the hub 11, it is to be noted that the drive motor 3 may be provided as an option where needed.

Figure 5:
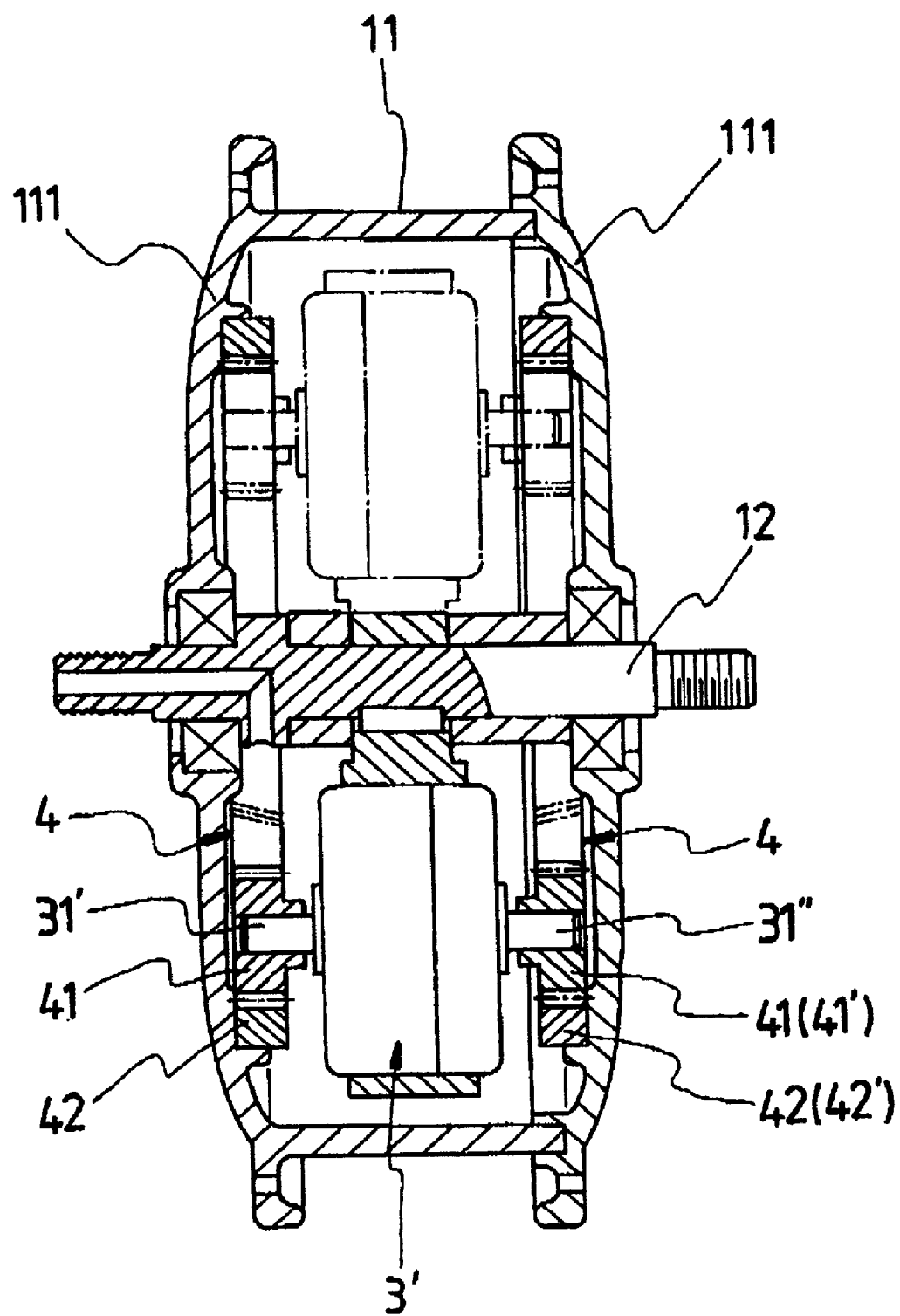
FIG. 5 is a frontal elevation of the invention comprising bilateral gear transmission with biaxial drive motor executed in one embodiment.

Next, as illustrated in FIG. 5, the drive motor 3 furnished the one or more on a position eccentrically in the hub 11 may be in the form of one 3' that is furnished with an output shaft on either of both ends thereof, each equipped with an output shaft 31', said drive motor 3' is to be mounted on a fitting 22 on the external end of the offset means 2, whereof the output shaft 31' on either end is equipped with gear 41 for the transmission means 4, and the interior of either of both disk shell 111 associated with the hub 11 of the external rotary assembly is furnished with an internal ringed gear 42 for the transmission means 4, so that mutual engagement of gear 41 with gear 42 is consummated and that serving to drive the external rotary assembly, where needed the drive motor 3' that is equipped with an output shaft on either of both ends thereof may be positioned eccentrically underneath the external rotary assembly so that center of gravitation is maintained on the under side, and that serving to redound to its stability, where needed there may be provided optionally one or more drive motor 3' each furnished with an output shaft on either of both ends thereof to drive the external rotary assembly through the transmission means.

Figure 6:
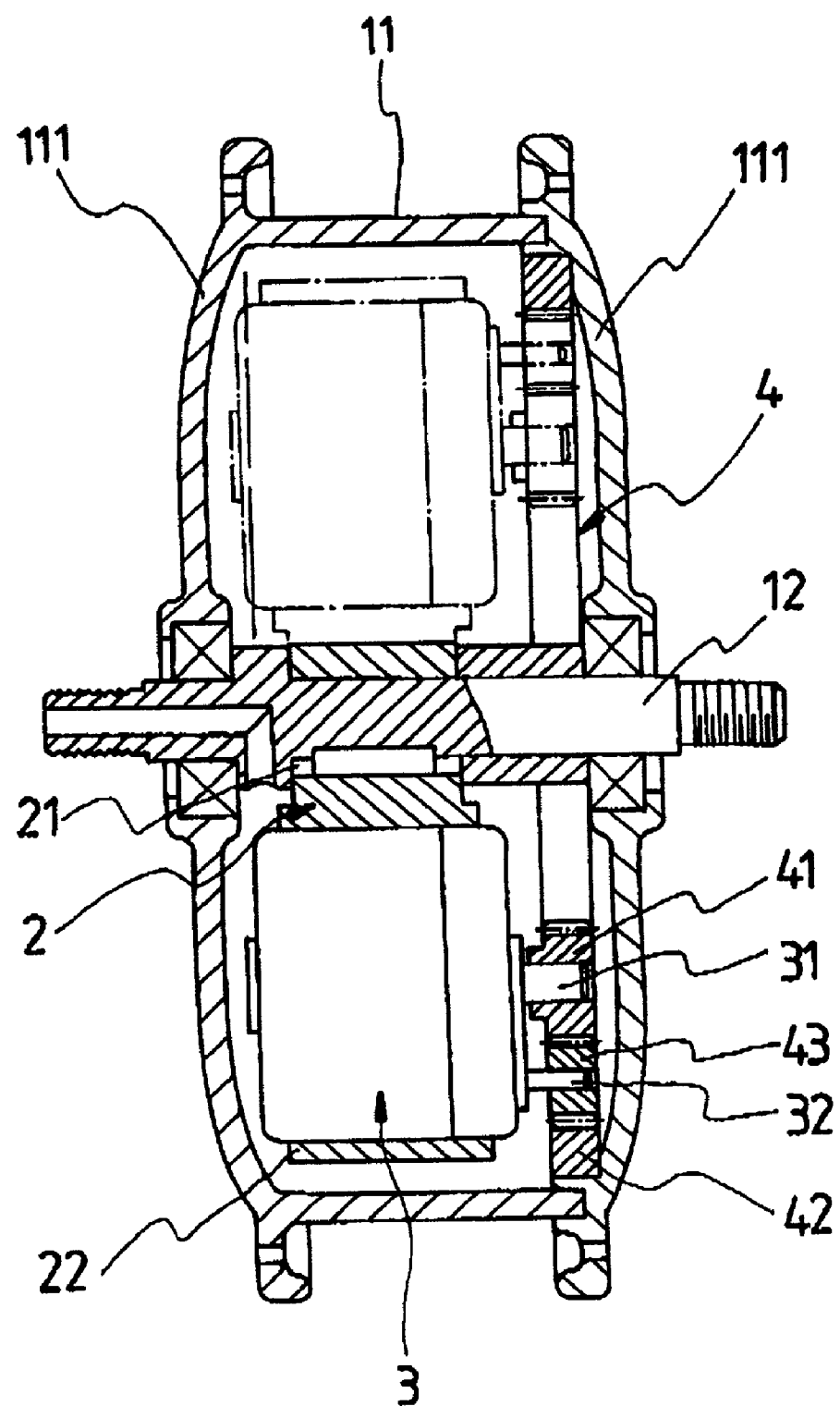
FIG. 6 is an illustration of the invention in the realization of a single side gear transmission into which is incorporated an idler.
Figure 7:
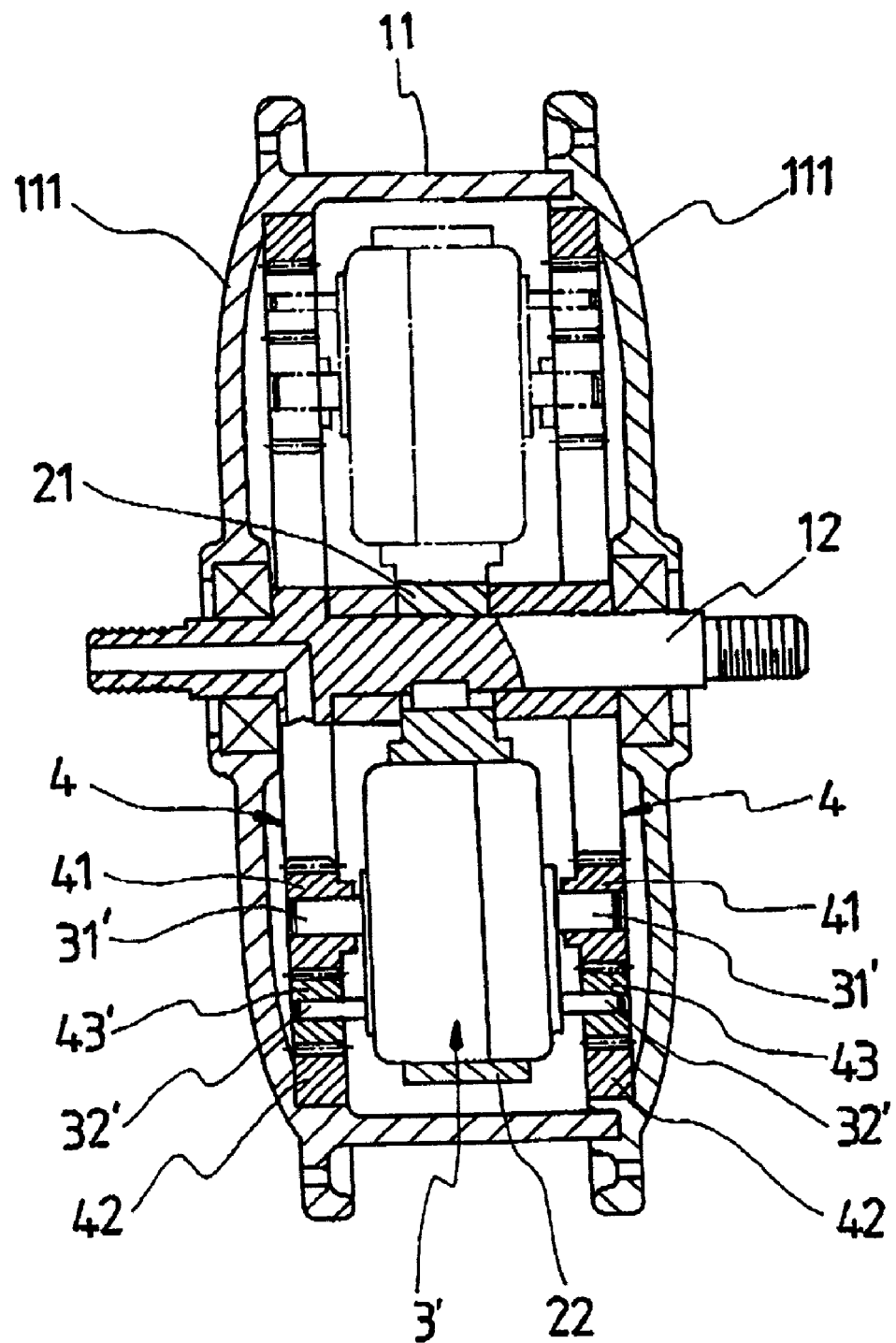
FIG. 7 is an illustration of the invention in the realization of a bilateral gear transmission into which is incorporated an idler.
Figure 7A:
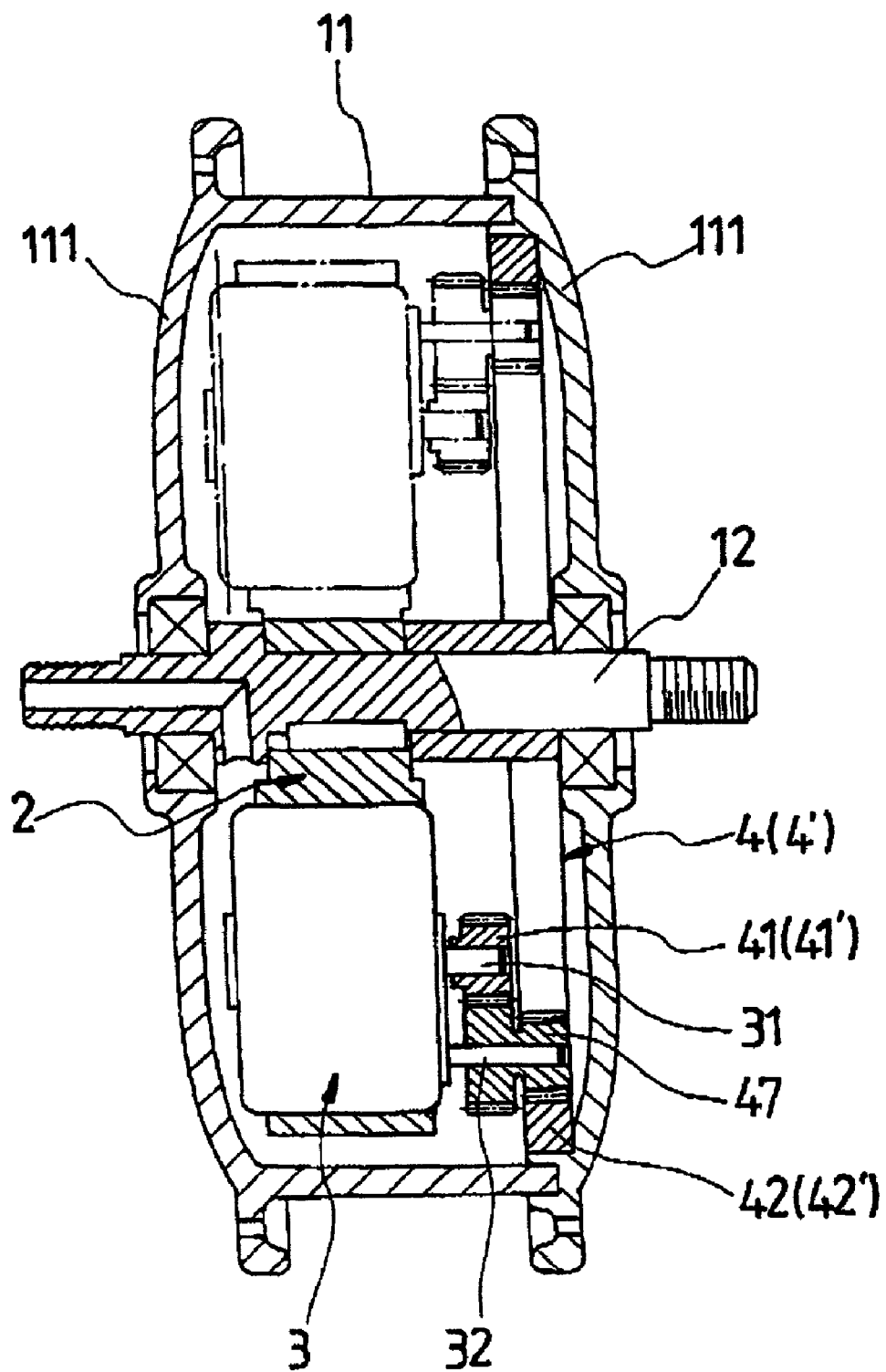
FIG. 7A illustrates the invention in an embodiment which incorporates multiple reducer gears.

The aforementioned embodiment may be executed otherwise, as illustrated in FIG. 6, FIG. 7 and FIG. 7A, to have a midway idler 43 or multiple reducer gears 47 introduced way between the gear 41 and the internal ringed gear 42 of the transmission means 4, to arrive at the effect of augmented speed reduction ratio, structurally boss shafts 32, 32' may be mounted on the obverse side of the drive motor 3, such as is shown in FIG. 6, or of the drive motor 3' which incorporates an output shaft on either of both ends thereof, such as is shown in FIG. 7, to these boss shafts 32, 32' may be attached said midway idler 43 or multiple reducer gear 47, such as is shown in FIG. 7A, so as to bring them engaged with said gear 41 and internal ringed gear 42, thus achieving effects of transmission at higher multiple of speed reductions.

Where desired, it is also feasible to have one or more drive motors 3, or drive motor 3' with dual output shaft feature on both ends, or with a midway idler 43 or multiple reducer gear 47 furnished on the offset means 2, to jointly drive the external rotary assembly by way of transmission means; also, as illustrated in FIG. 5, the transmission means 4 that is mounted on either of both output shafts 31' of the drive motor 3' integral with dual output shaft feature and accommodated in the external rotary assembly may be executed in the form of a bevel gear 41' in combination with an internal ringed bevel gear 42', the internal ringed bevel gear 42' being furnished on either side inside the hub 11, whereas the bevel gear 41' is mounted on the output shaft 31' of either of both sides of the drive motor 3' featuring dual output shaft configuration such that the engagement of the bevel gear 41' with the internal ringed bevel gear 42' will suffice to offset axial component of the force once the bevel gear 41' runs in rotation.

Figure 8:
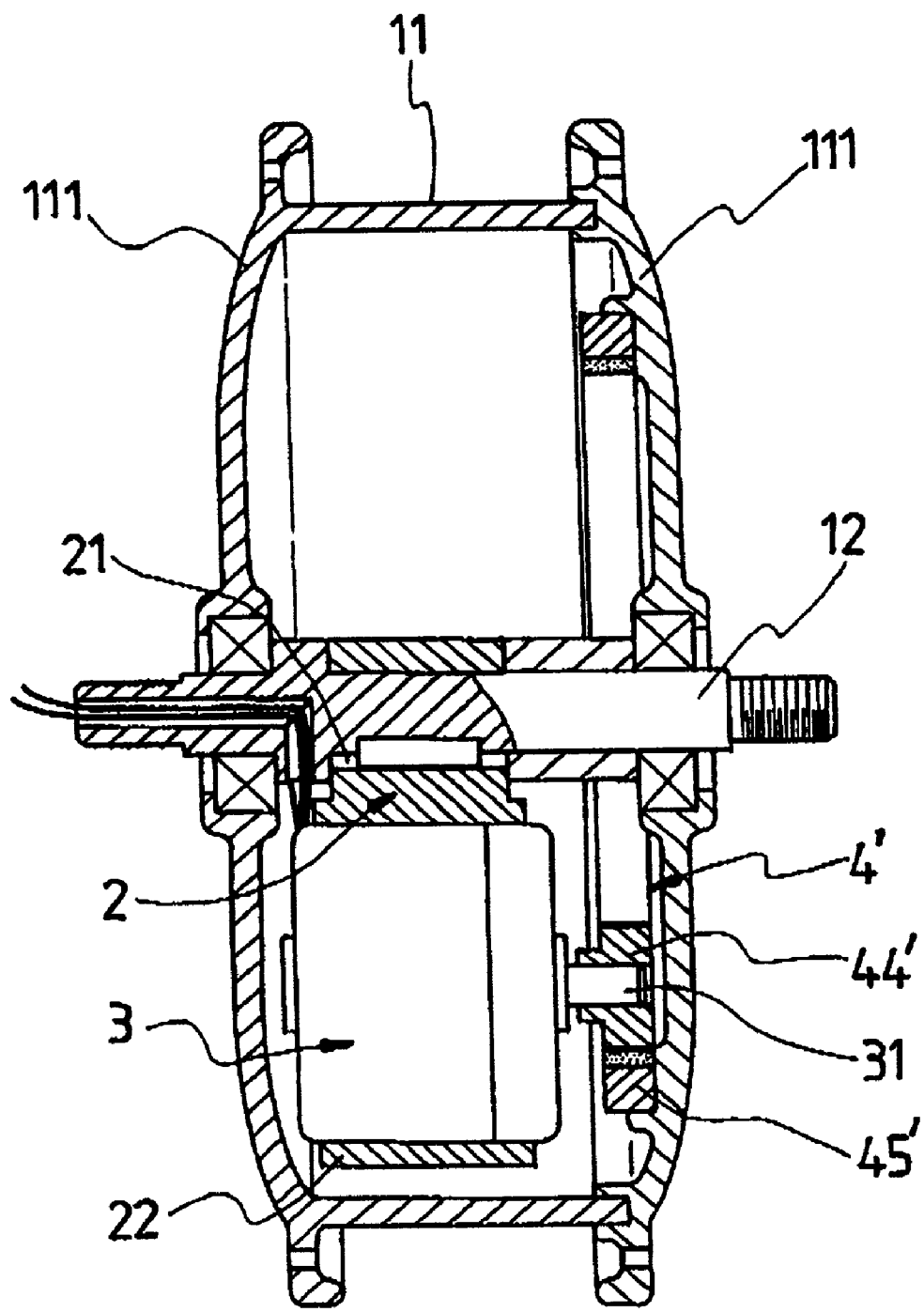
FIG. 8 is a frontal elevation of the invention embodied in a unilateral friction wheel transmission system.
Figure 9:
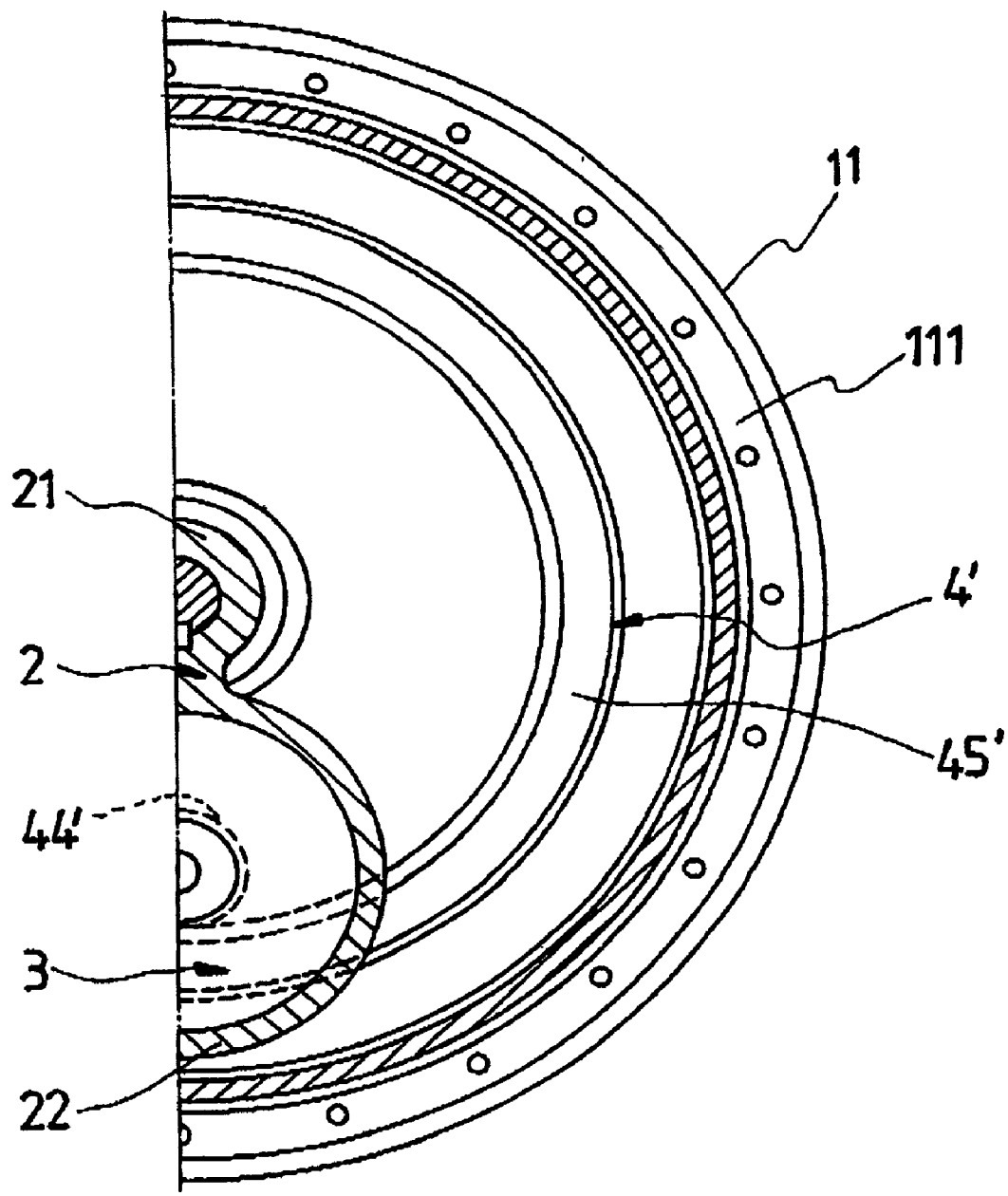
FIG. 9 is a partially taken side view of the invention exemplified in a unilateral friction wheel transmission system.
Figure 10:
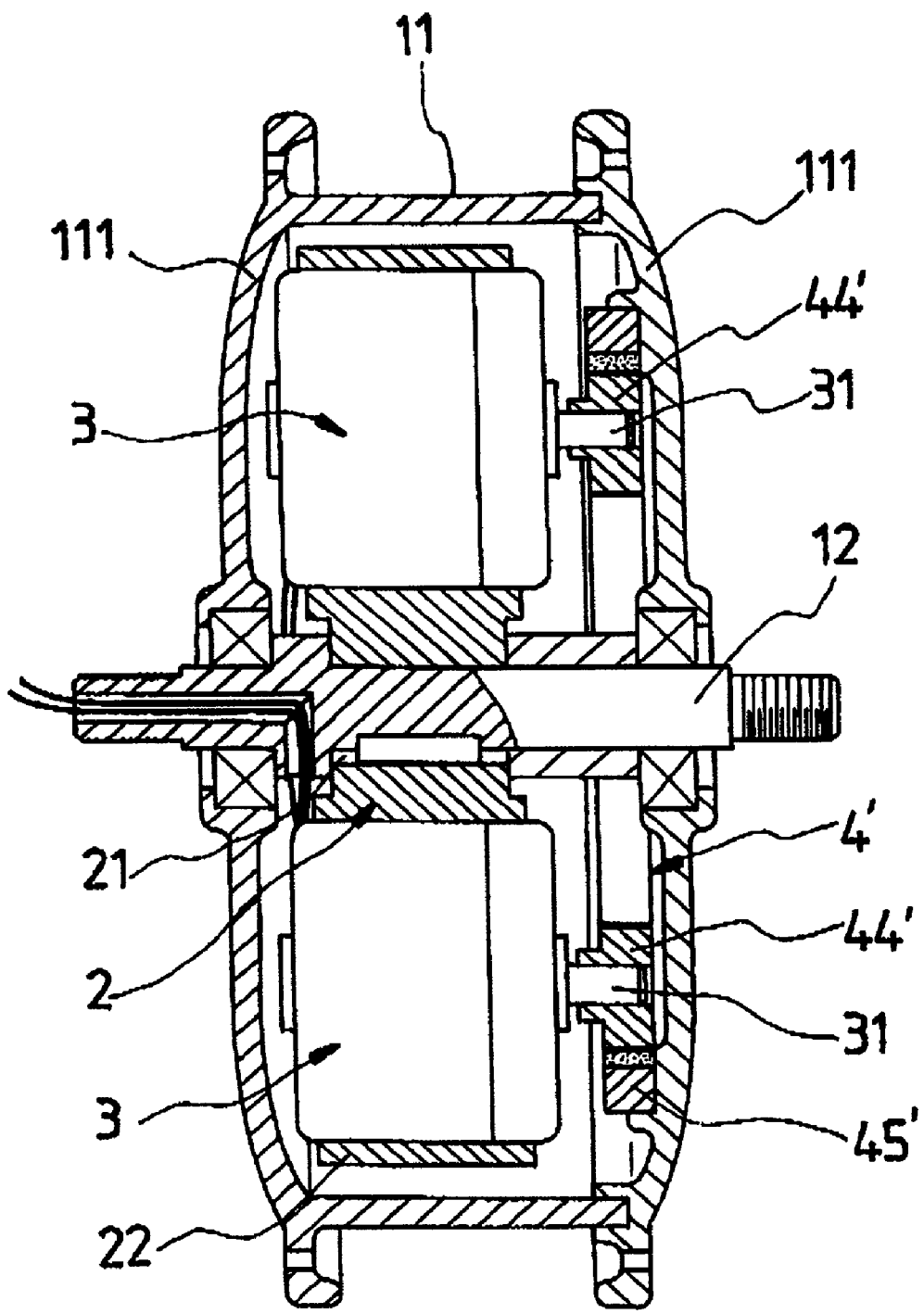
FIG. 10 illustrates the invention exemplified in a unilateral friction wheel transmission with a number of offset motors.

Speaking of the device for externally rotary drive of offset motor, comprising aforementioned external rotary assembly, offset means 2, drive motor 3 and transmission means 4, the transmission means 4 may be one which consists of a friction wheel 44' and an internal ringed friction wheel 45', and this in lieu of the aforementioned drive 4 as composed of gear 41 and internal ringed gear 42; as exemplified in the illustrations given in FIG. 8 and FIG. 9, where the drive 4' is composed of a friction wheel 44' and an internal ringed friction wheel 45', with the friction wheel 44' installed on the output end of the output shaft 31 of the drive motor 3 configured on the fitting 22 outside of the offset means 2, and the internal ringed friction wheel 45' fitted to one side inside the hub 11 of the external rotary assembly, and, that being done, the friction wheel 44' and the internal ringed friction wheel 45' brought to thrust upon each other internally, thereby conveying the power delivered by the drive motor 3 to the external rotary assembly, and that bringing the hub 11 coupled to the fix shaft 12 to consummate in rotation. In a variant design illustrated in FIG. 10, on a fitting 22 positioned on a radial extension of the offset means 2 are mounted two or more drive motors 3 whereof the end of the output shaft 31 of each is equipped with a friction wheel 44', and, with the internal ringed friction wheel 45' attached to one side inside the hub 11, then having the friction wheel 44' and the internal ringed friction wheel 45' brought to bear against each other internally, what will follow in suit is that said several drive motors 3 will convey the power way from the friction wheel 44' and internal ringed friction wheel 45' to the external rotary assembly, thereby binding the hub 11 to rotation on the fix shaft 12.

Figure 11:
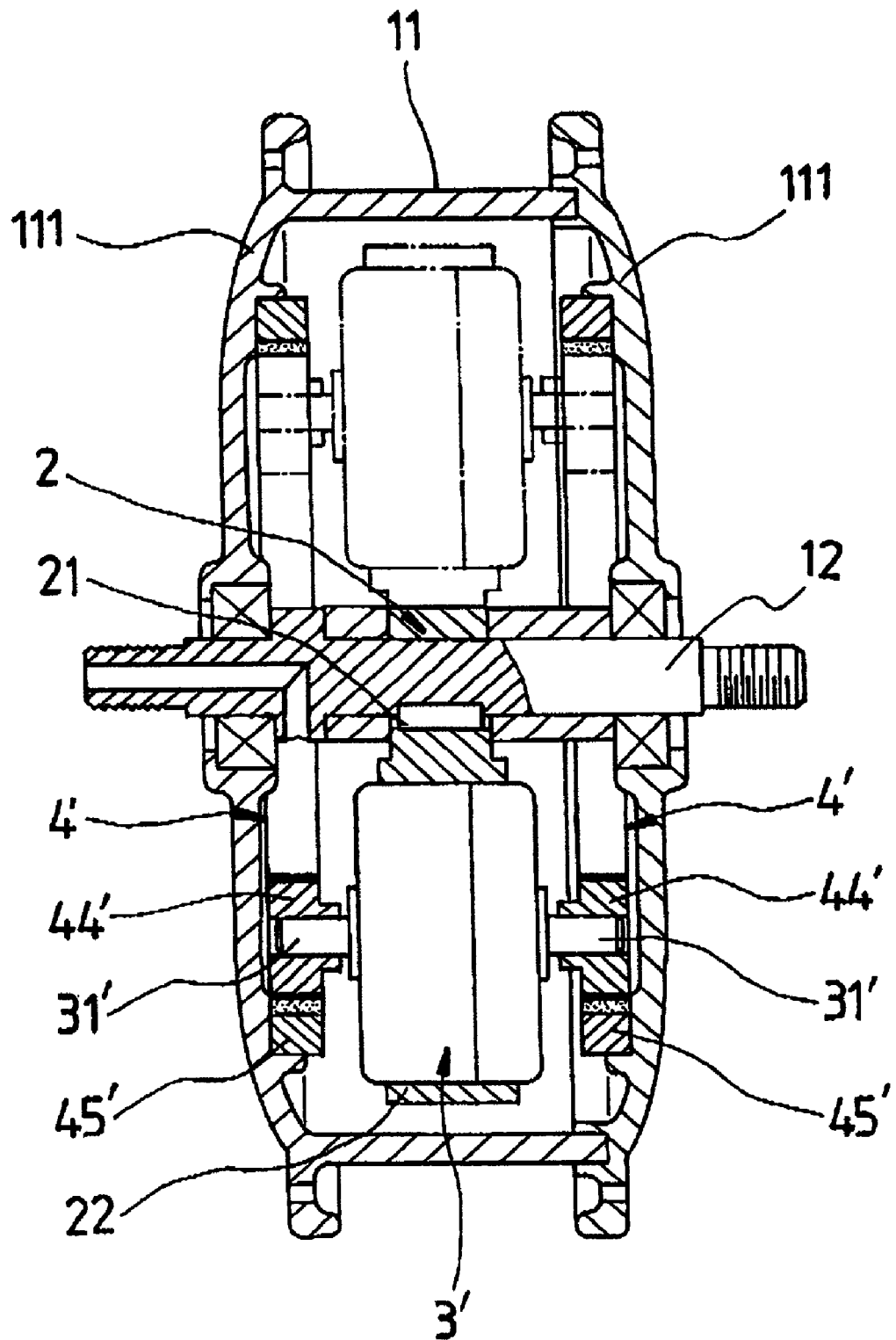
FIG. 11 illustrates the invention exemplified in a bilateral friction wheel transmission system.

Referring to FIG. 11, it will be seen that when applied on a drive motor 3' with dual output shaft configuration which incorporates an output shaft 31' on either end, the design according to the invention teaches not only to have one or more such drive motor 3', as defined herein, arranged by attachment to a fitting means 22 positioned on a radial extension of the offset means 2, but also to have internal ringed friction wheel 45' serving the purpose of a drive means 4' installed inside two disk shell halves 111 relative to the hub 11 of the external rotary assembly, so that each friction wheel 44' and the internal ringed friction wheel 45' are brought to bear upon each other internally, and that serving to actuate the rotary assembly, also, an option is allowed for the drive motor 3' endowed with dual output shaft transmission capability to be positioned by being deviated underneath the external rotary assembly, with the center of gravitation thereby maintained on the under side its stability is enhanced, as a further variation where needed it is practicable to have more than one drive motor 3' equipped with dual output shaft capability installed on the offset means 2 to consummate in joint transmission of the external rotary assembly by way of said drive means.

Figure 12:
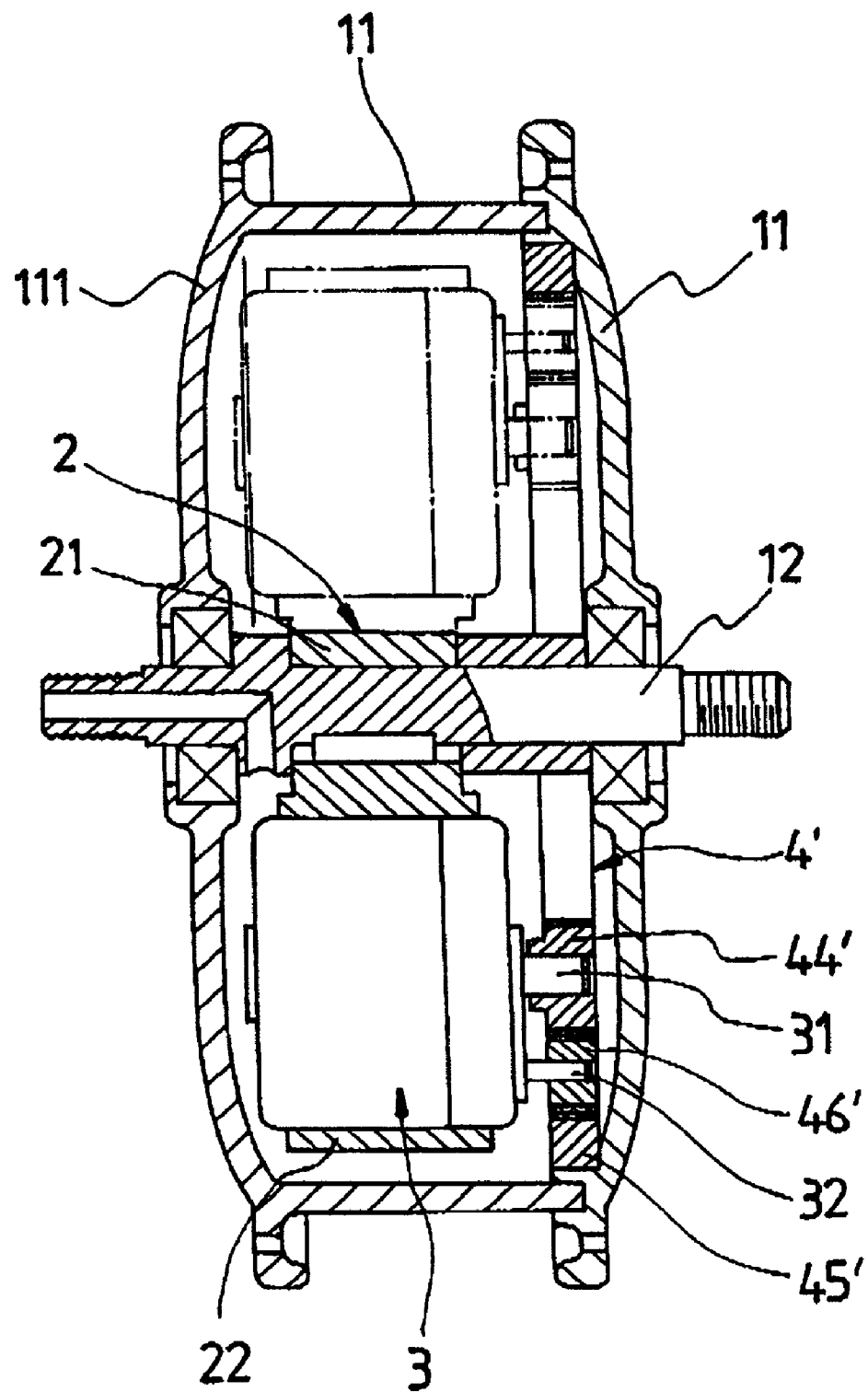
FIG. 12 illustrates the invention exemplified in a unilateral friction wheel transmission into which is incorporated a midway idler.
Figure 13:
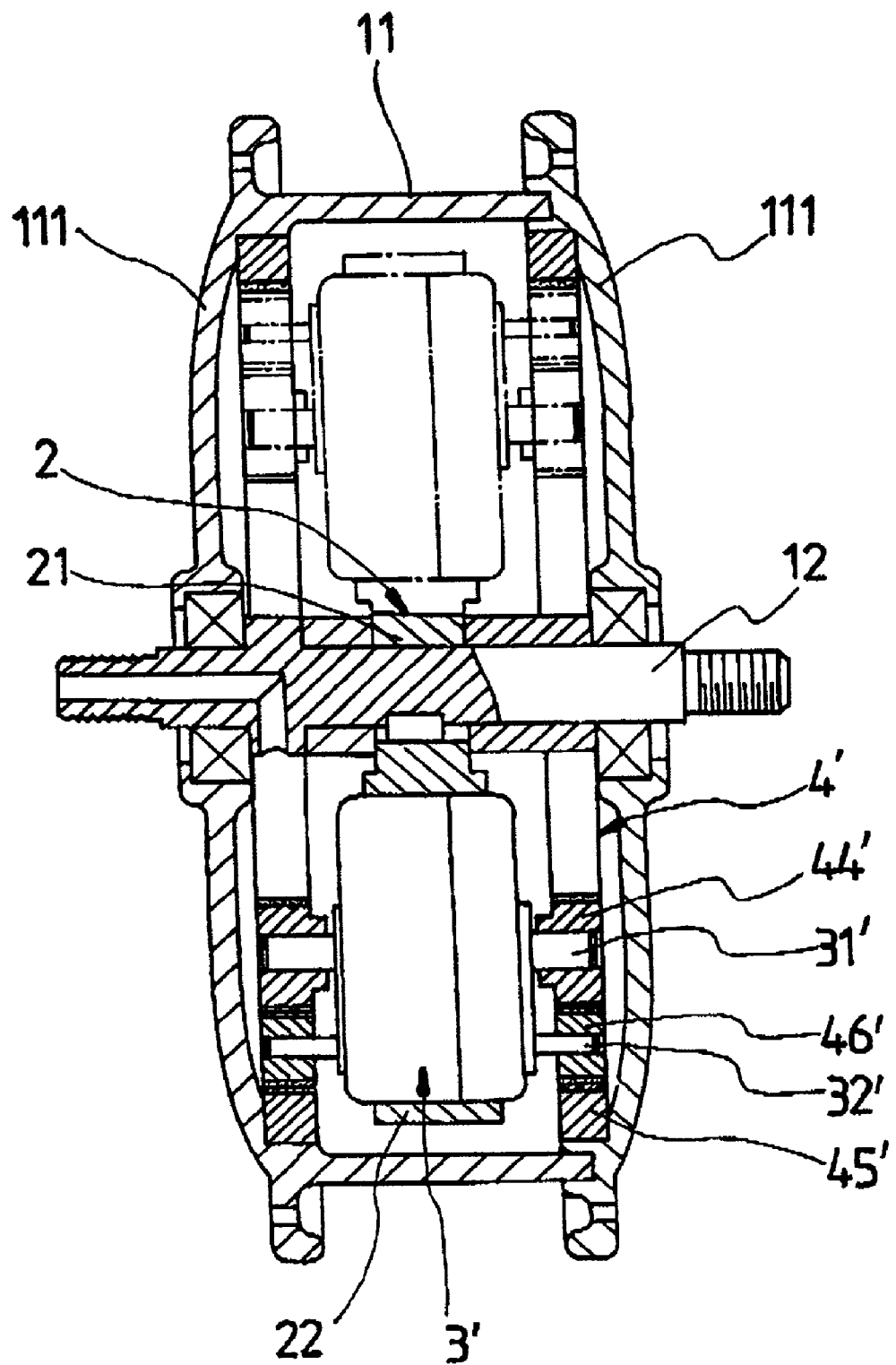
FIG. 13 illustrates the invention exemplified in a unilateral friction wheel transmission into which is incorporated a midway idler.
Figure 13A:
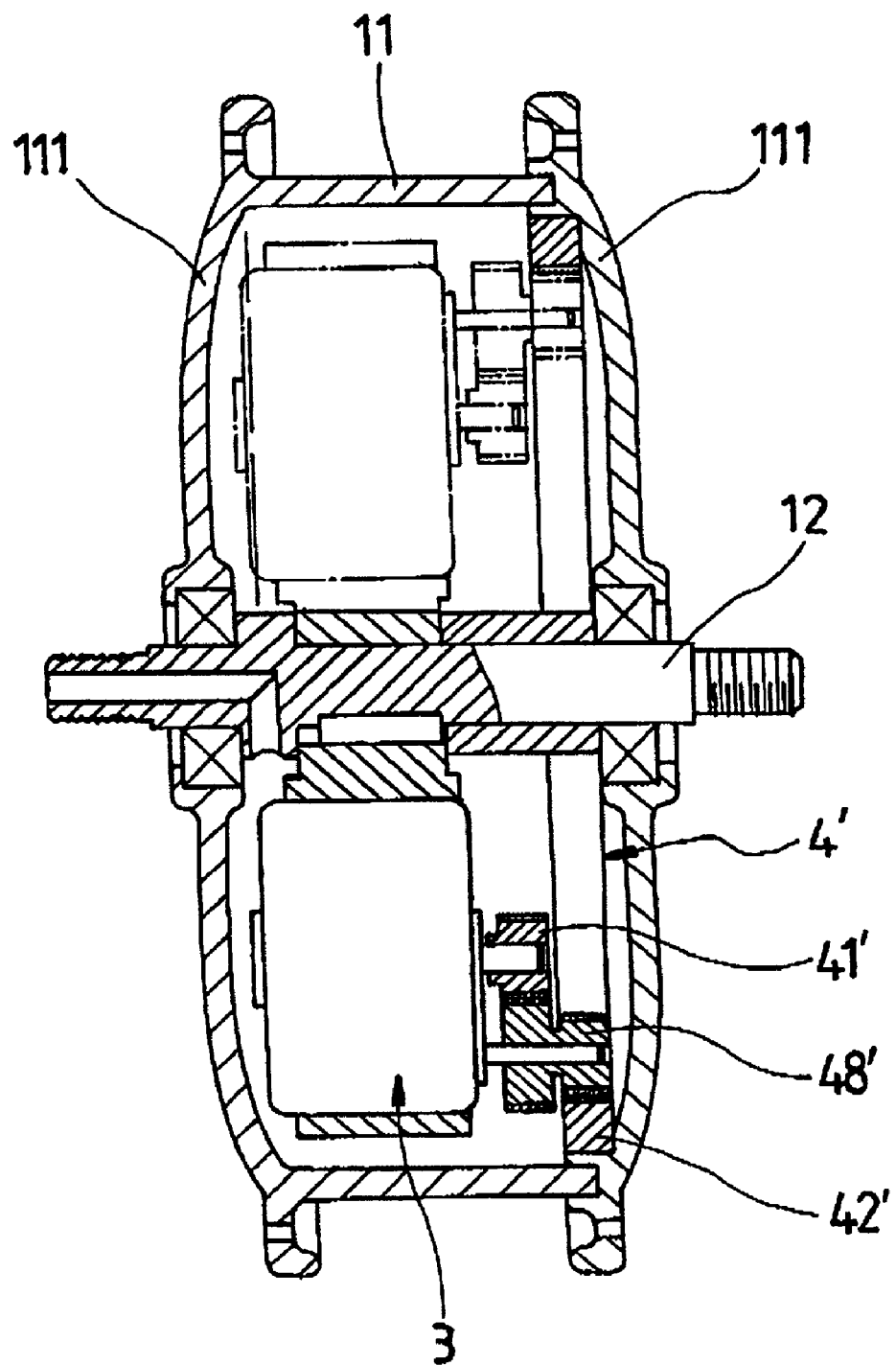
FIG. 13A illustrates the invention exemplified by the addition of multiple reducer friction wheels.

In embodiments represented in FIG. 8, FIG. 9, FIG. 10 and FIG. 11 realization of the invention may be proceeded in accordance with illustrations covered in FIG. 12, FIG. 13 and FIG. 13A, by optionally introducing interim friction wheel 46' or multiple stage reducer friction wheels 48' way between the friction wheel 44' and internal ringed friction wheel 45' in the framework of the transmission means 4', to arrive at effects of multiple speed reduction performance, structurally, there are to be furnished convex shafts 32, 32' additionally on the frontal end of a single shaft drive motor 3, such as is shown in FIG. 12, or of one drive motor 3' defined with an output shaft on either of both ends thereof, such as is shown in FIG. 13, to accommodate coupling thereon by the interim friction wheel 46' or multiple stage speed reduction friction wheel 48', such as is shown in FIG. 13A, so as to bring same into mutual contact with the friction wheel 44' and internal ringed friction wheel 45', treated altogether, to thereby arrive at effects of transmission with multiple speed reduction, moreover, where justified an option is open to have one or more drive motors 3 installed on the offset means 2, or alternatively to let a drive motor 3' with dual output shaft drive feature together with an interim friction wheel 46' or multiple speed reduction friction wheel 48' be installed instead to consummate in actuation of the external rotary assembly by way of the drive means.

Figure 14:
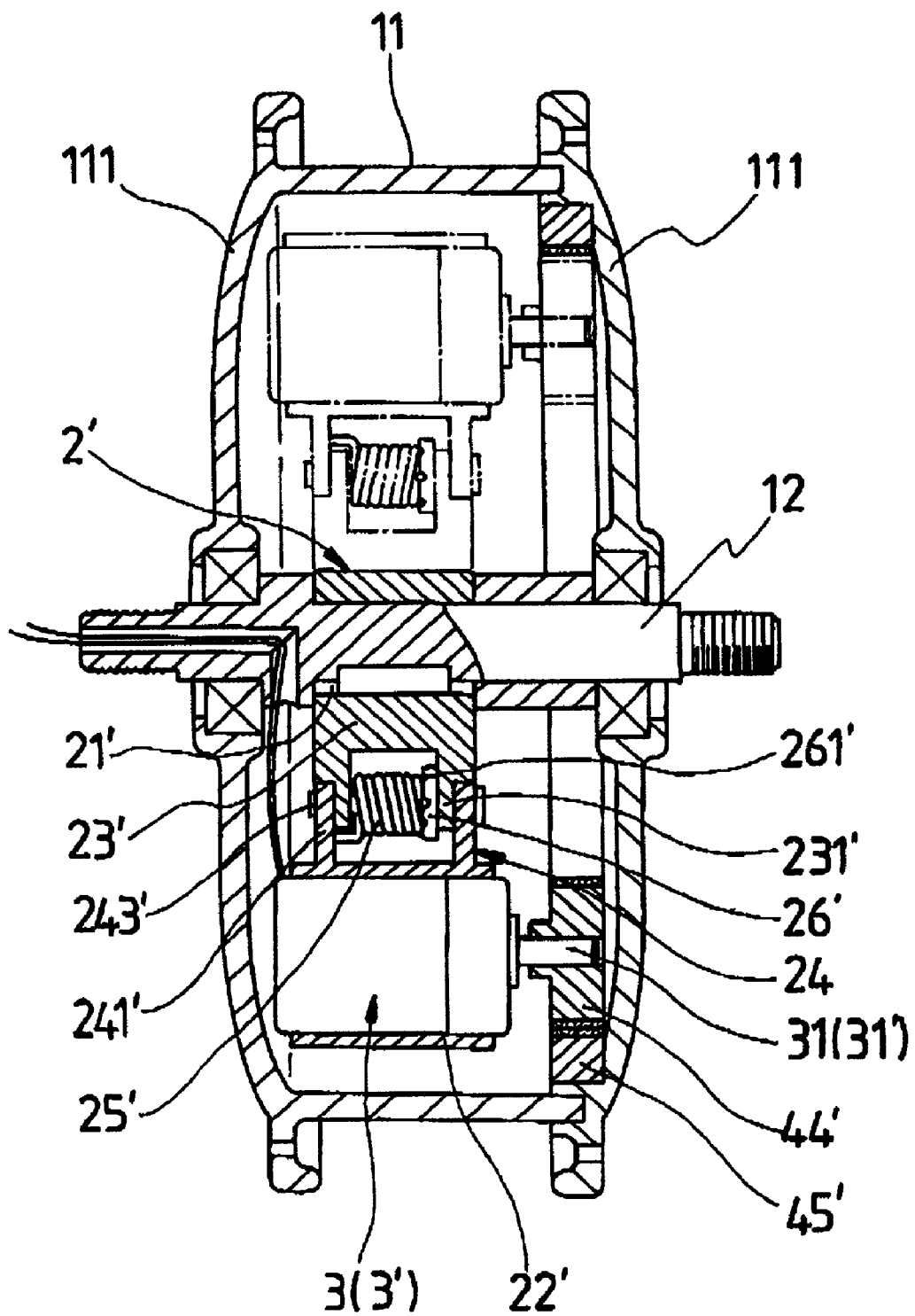
FIG. 14 is a frontal elevation of the invention embodied to have the dislocated feature executed in a bent arm.
Figure 15:
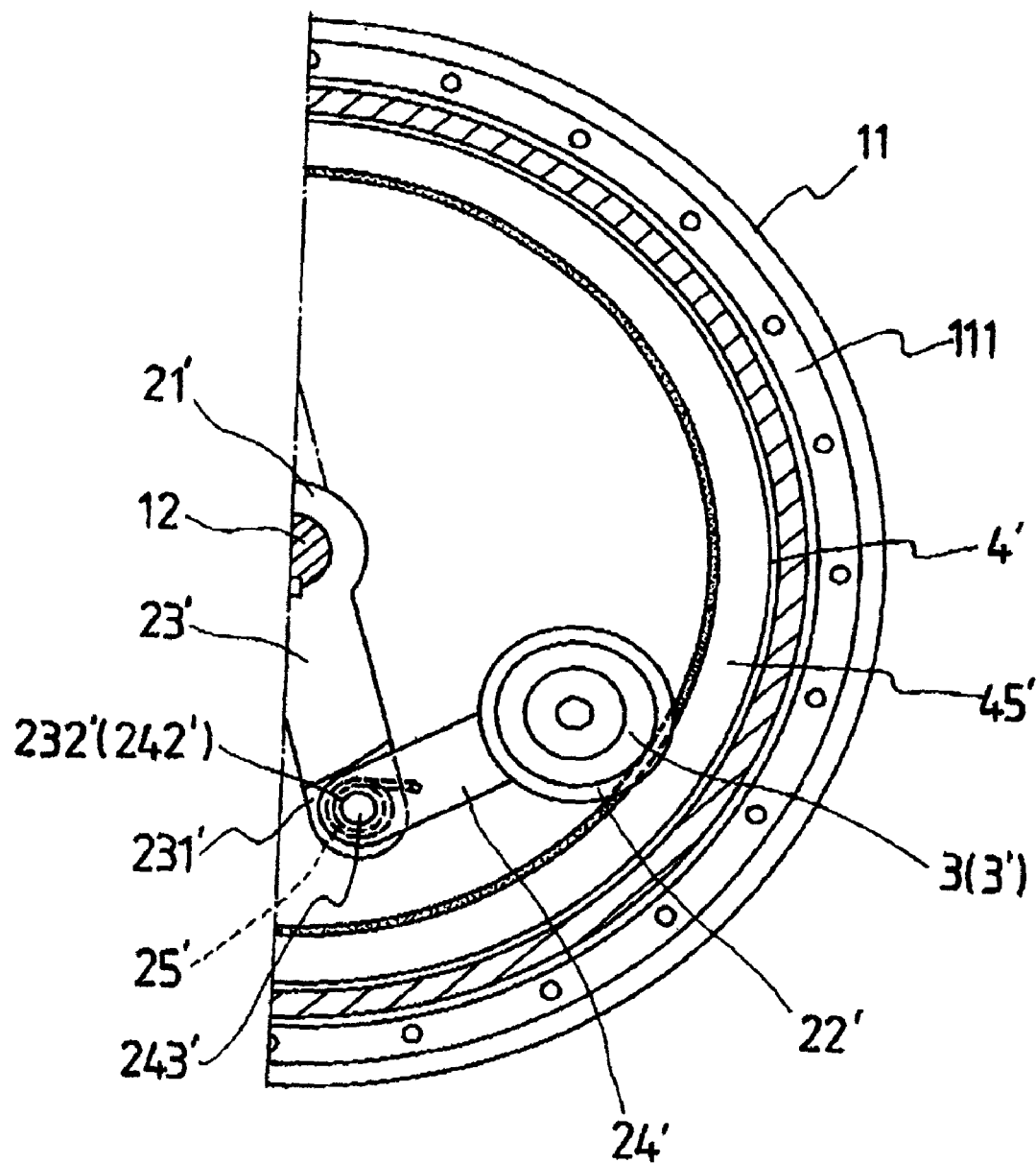
FIG. 15 is a partially taken side view of the invention embodied to have the dislocated feature executed in a bent arm.

The external rotary drive assembly according to the invention may be structured in still another embodiment such as is illustrated in FIG. 14 and FIG. 15, by executing the offset means 2' into the pattern of a bent arm allowing for the storage of reserved pressure and resiliency for flexure, comprising an immobilized arm 23', a movable arm 24', resilient swinging unit 25' and torque adjustment disk 26', on top of said immobilized arm 23' is attached aforementioned cone coupling means 21', meant for coupling with the fix shaft 12, while on either of both sides of the end thereof are furnished boss pieces 231' flanked with penetration holes 232' on lateral walls thereof; on the terminating end of the movable arm 24' is provided aforementioned fitting means 22', on both sides on top of same are provided boss pieces 241' flanked with penetration holes 242' on lateral walls thereof, whereby both boss pieces 241' are coupled to both boss pieces 231' on the terminating end of the immobilized arm 23' and axial pin 243' is established across penetration holes 232', 242' so that the movable arm 24' is made movable with respect to it; the torsional resilient member 25', in the form of a torsional spring, is coupled by attaching to an axial pin 243' seated midway between both boss pieces 241' of the movable arm 24', with one end attached to said movable arm 24', the other end caught in the torque adjustment disk 26' which, in the form of a disk, has a plurality of radiating coulisses 261' inside to allow for catch-on engagement with the other end of the torsional resilient member 25' whose preserved torque may thereby be adjusted, and that in turn accounting for resiliently preserved pressure which is enough a control of the movable arm 24' of the offset means 2', the aforementioned bent arm structure allowing for the setting of preserved pressure and for resilient flexure may be embodied otherwise but so that the same function is created within the teaching of the invention, the aforementioned bent arm structure allowing for adjustment of pressure preserved may comprise one or more set of movable arm 24' on said offset means 2', while the immobilization means 22' on its terminating end may be symmetry be equipped with one or more drive motor 3 or one 3' featuring dual output shaft, further, to the output shaft 31 or 31' of respective motor may be attached a friction wheel 44' for the drive means 4', and by imposing the pressure preserved in respective friction wheel 44', duly pressurized, upon the internal ringed friction wheel 45' inside the hub 11, transmission of the hub 11 for the external rotary assembly may be consummated at reduced speeds, further, adjustment made of the engagement point between the resilient member 25' in which pressure is preserved and the torque adjustment disk 26' it is possible to effect an adjustment of the contact pressure by which the friction wheel 44' and the internal ringed friction wheel 45' confront each other.

Figure 16:
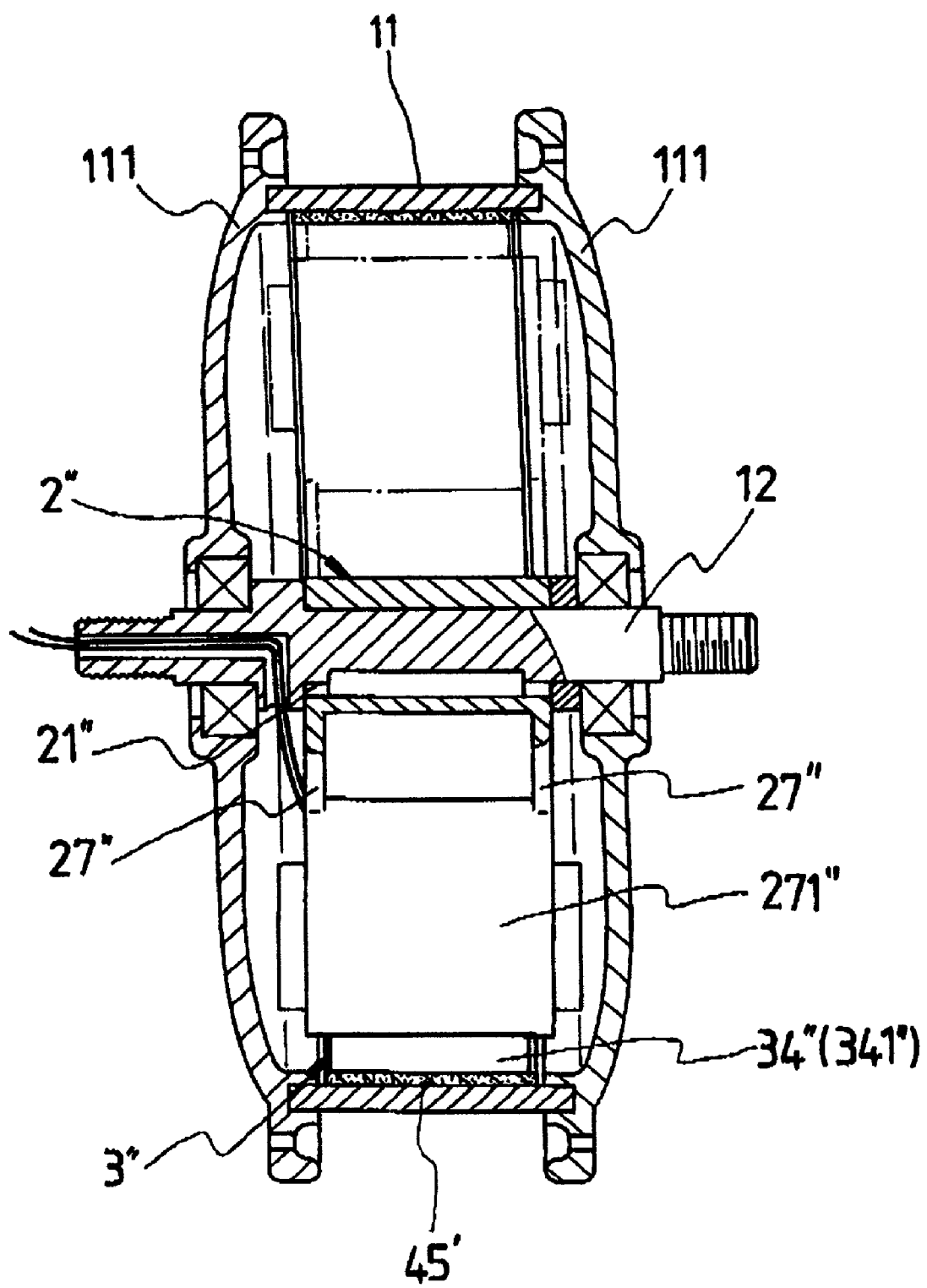
FIG. 16 is a frontal elevation of the invention embodied to derive transmission with the rotor of the drive motor straight.
Figure 17:
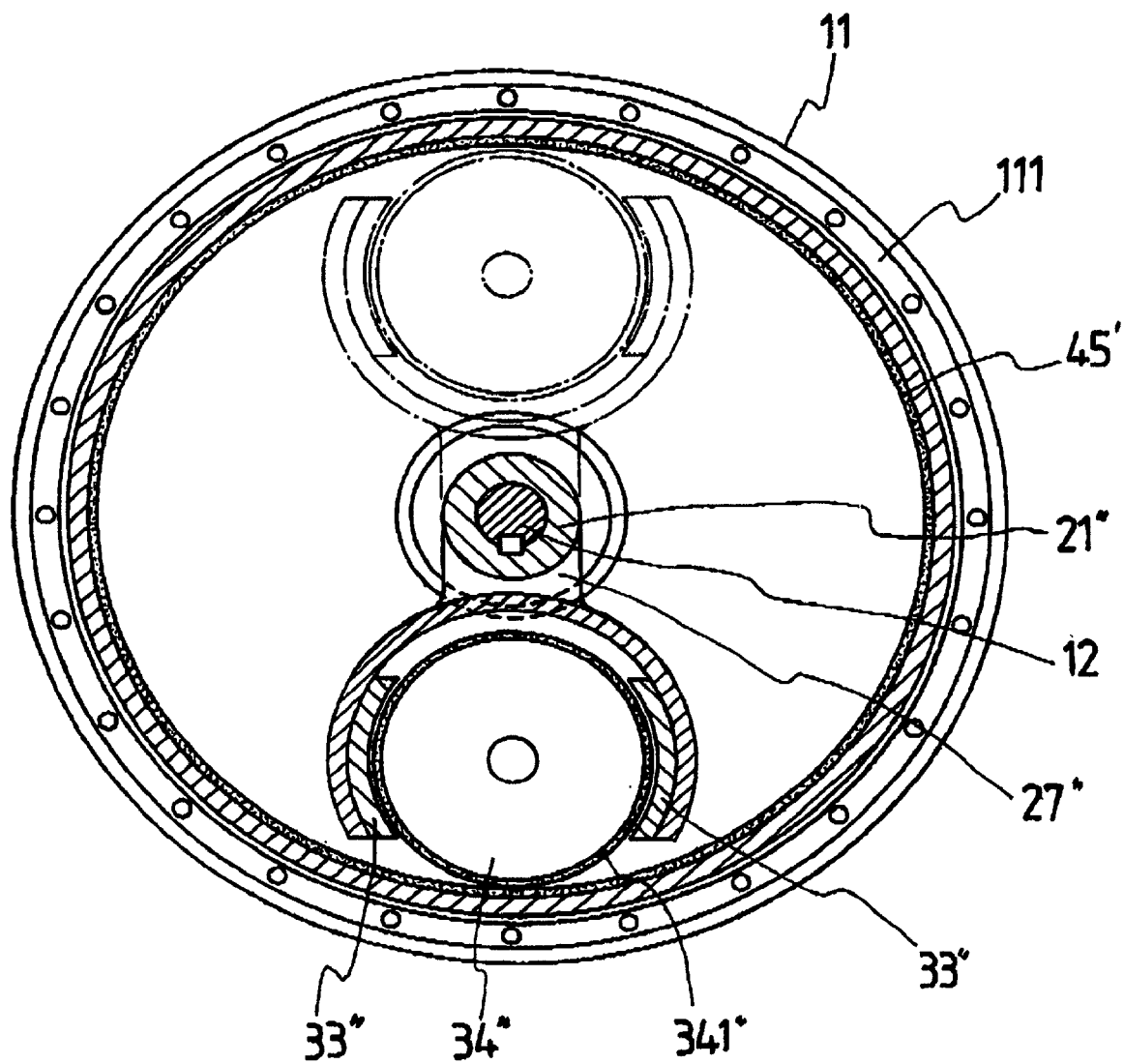
FIG. 17 is a partially taken side view of the invention embodied to derive transmission with the rotor of the drive motor straight.

Still another embodiment of the present invention respecting the offset means and drive motor concerned, as shown in FIG. 16, FIG. 17, the drive motor may be in the form of one that has its rotor exposed, provided singly or plurally, on a coupling receptacle 21" on a radial extension of the offset means 2", what with a magnetic field 33" to which the motor is subjected, on both sides of the motor shell 271" and the furnishing of rotor 34" way between the pair of magnetic fields 33" whereby the drive motor 3" is produced, the pavement of friction stuff 341" around said rotor 34", the provision of an internal ringed friction wheel 45' inscribed in the hub 11 of the external rotary assembly, actuation by the exposed rotor of the annularly provided friction stuff 341", of the friction wheel inscribed in the hub 11 of the external rotary assembly will bring about forthright reduced transmission, to the effect that once rotor 34" runs in rotation in tune with the stator 33" provided by symmetry, the hub 11 on the external rotary assembly will be driven in step.

Figure 18:
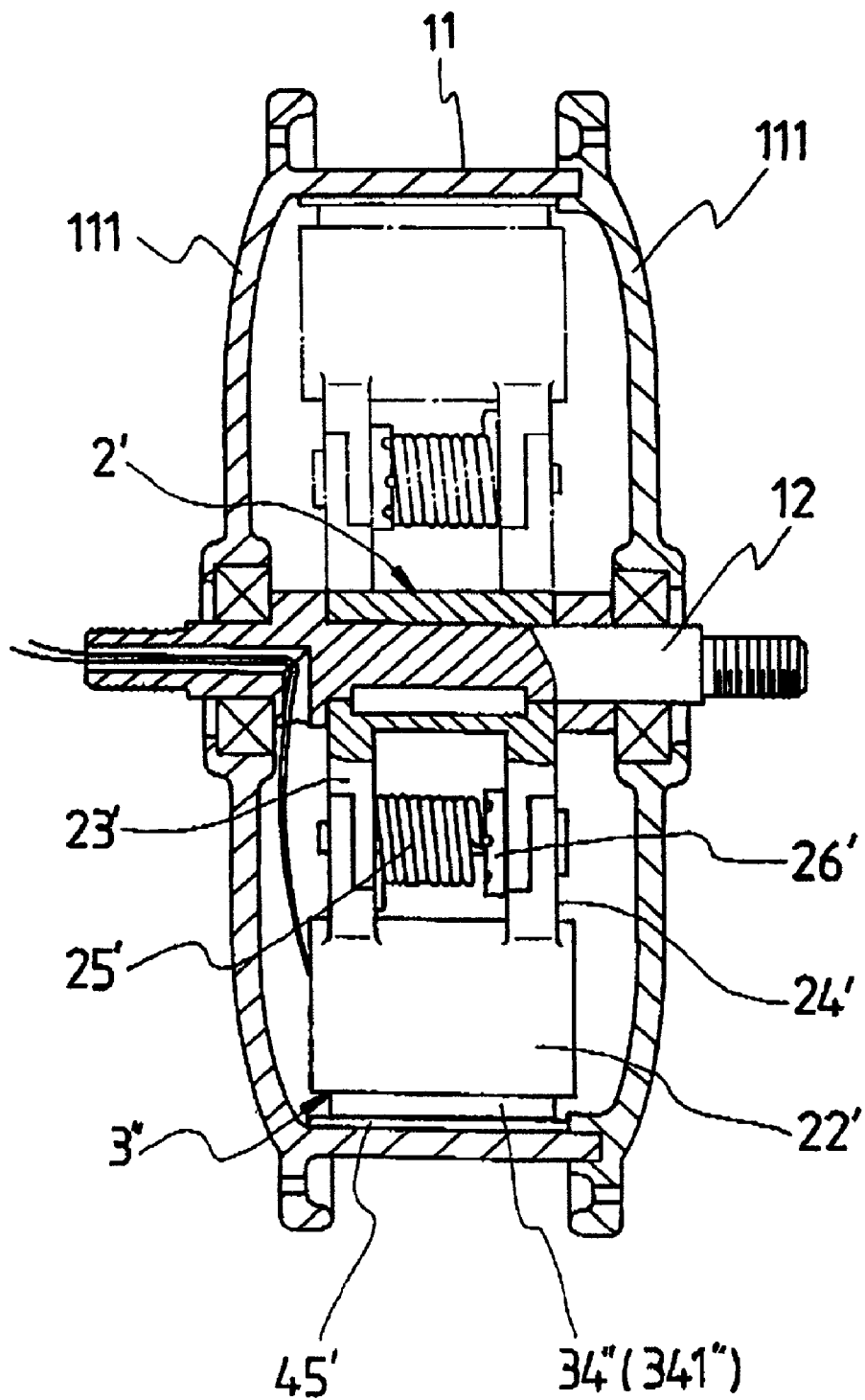
FIG. 18 is a frontal view of the invention embodied to have a bent arm configuration, whereof transmission is derived from the rotor of the drive motor straight.
Figure 19:
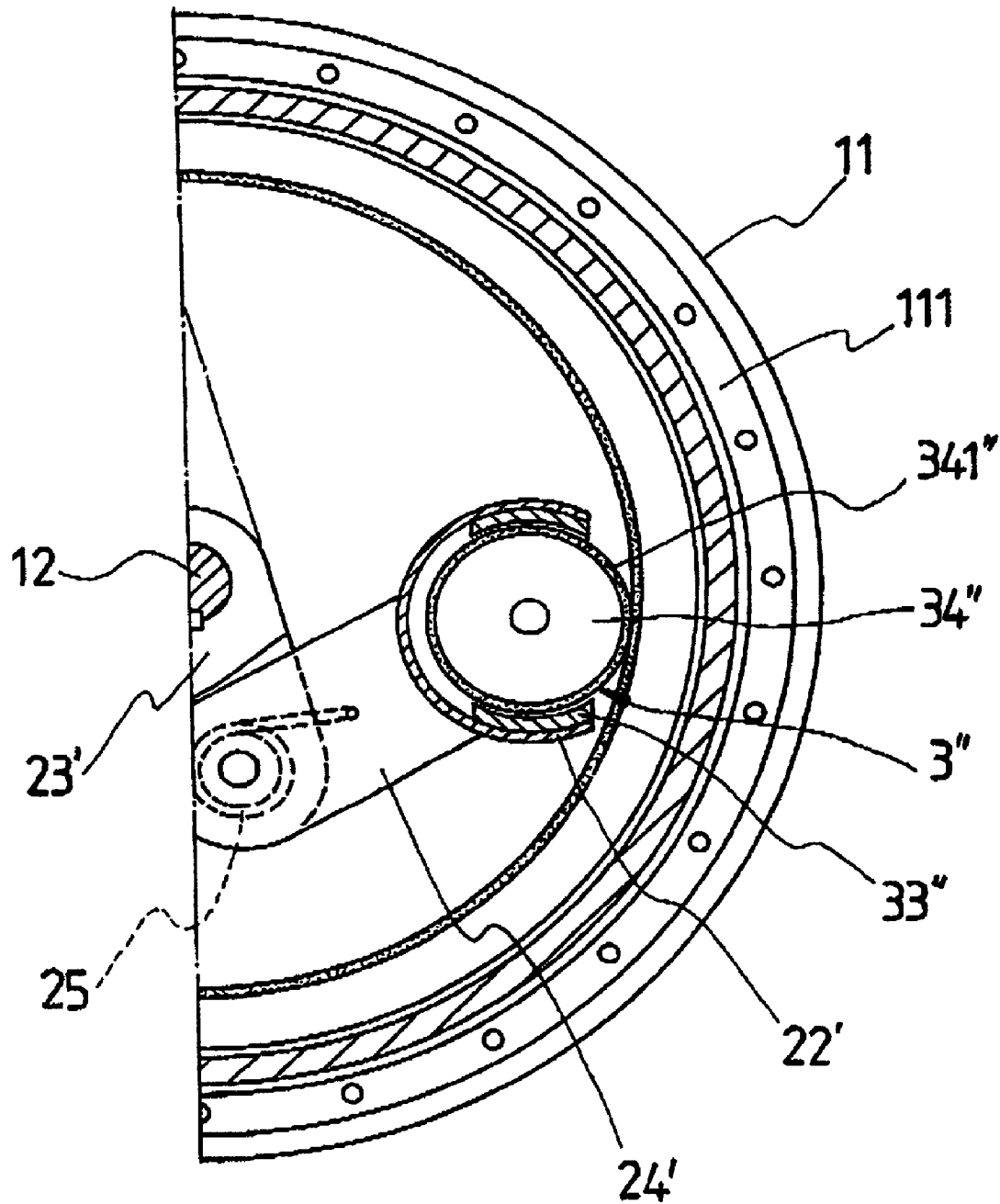
FIG. 19 is a side view of the invention embodied to have a bent arm configuration, whereof transmission is derived from the rotor of the drive motor straight.

The execution of direct transmission of the hub on the external rotary assembly by rotor of the drive motor, the rotor in this instance being exposed to the view, together with the offset means as illustrated in FIG. 16, FIG. 17, may be embodied alternatively as shown in FIG. 14 and FIG. 15, by the incorporation of a bent arm means into which pressure may be preserved and the arm being resilient in its makings, so as to increase its transmission efficiency as well as operational stabilities, in respect of which illustrations are given in FIG. 18, FIG. 19 while the bent arm means as to which pressure may be preserved and which is made flexible by itself may be structured as illustrated in FIG. 14 or FIG. 15, and that not necessarily restricting it from assuming otherwise configuration so long as its intended functions remain the same.

The aforementioned bent arm means which allows for regulation of pressure preserved therein may be executed in the form of one or more sets of movable arms 24' mounted on the offset means 2', and that supplemented with one or more drive motor which is equipped with one or more exposed rotor positioned by symmetry on the immobilization means 22' on the terminating end thereof, the perimeter of said rotor of the drive motor being stocked with friction stuff, and the same motor rotor is made to drive directly the friction wheel 45' inscribed in the hub of the internal rotary assembly so that said hub 11 is transmitted at a reduced rate, furthermore, by adjusting the mutual engagement positioning way between the prestressed resilient member 25' and the torque adjustment disk 26' pressure of contact by which the friction wheel 44' and the internal ringed friction wheel 45' confront each other is adjusted accordingly.

Figure 20:
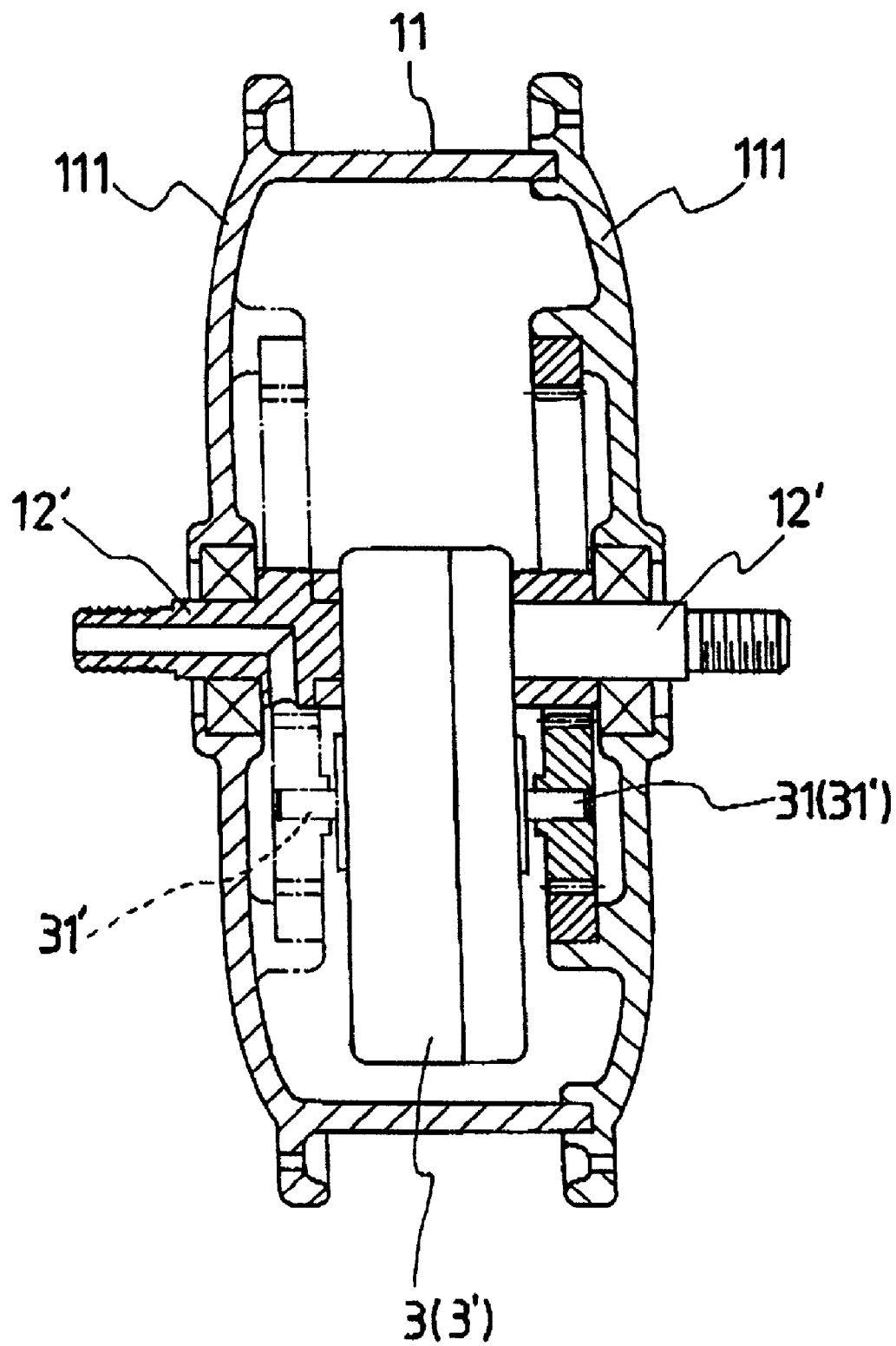
FIG. 20 is an illustration of the invention, given in cross section, of the execution whereby both terminating sides of the drive motor are coupled direct to the fix shaft; and, FIG. 21 is another illustration of the invention, given in cross section, of the execution whereby both terminating sides of the drive motor are coupled direct to the fix shaft.
Figure 21:
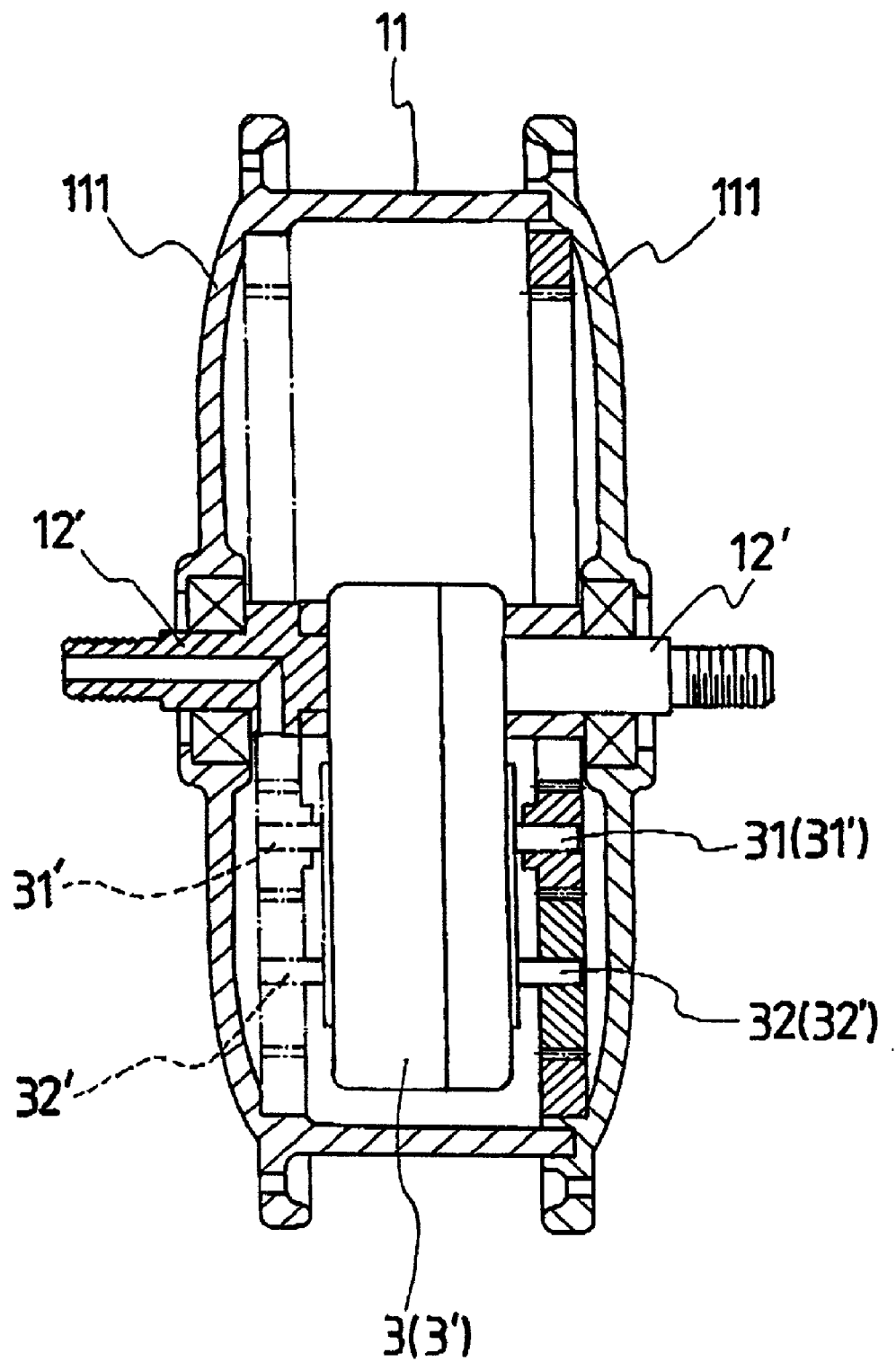

Referring to FIG. 20, FIG. 21, it will be appreciated that the external rotary drive assembly of the offset motor may be embodied otherwise by having the drive motor 3 or the drive motor means 3' featuring dual output shafts structured to have a fix shaft 12' provided protrusively about the eccentric location on both ends, that is, by having aforementioned fix shaft 12 established on eccentric location on both ends of the drive motor 3' featuring dual output shafts or on the drive motor 3, with the fix shaft 12' being housed in the hub 11 of the external rotary assembly, the drive motor 3 or the drive motor 3' featuring dual output shafts is made eccentric on completion of assemblage, the output shaft 31 will, by one end or both ends thereof, fit for the fitting of gear to drive the internal ringed gear duly coupled or alternatively of a friction wheel serving to drive the internal ringed friction wheel as coupled, or still in another variant as shown in FIG. 21, by having the drive means 4, 4' equipped with a midway idler the stability of the offset configuration will be enhanced, and that serving in turn to increase operation efficiency at the same time.

The disclosure going thus far should suffice to say that the invention titled Device for Externally Rotary Drive of Offset Motor is truly a worthy piece of invention which is being submitted to your highly esteemed authority for the granting of Letters Patent, as requested.

I claim:

1. A drive apparatus, comprising:
    an external rotary assembly having a hub (11) mounted on a central shaft (12);
    offset means (2) fixed within the hub, the offset means having an offset device (22');
    a transmission means (4') positioned within the hub;
    a drive motor (3) having an output shaft (31), the drive motor being accommodated in the offset device in drivable engagement with the hub via the output shaft and the transmission means, the output shaft being parallel to the central shaft;
    a movable arm (24') pivotally attached to the offset device, the drive motor being attached to the movable arm (24');
    a resilient member (25') interposed between the movable arm and the offset device; and
    a torque adjustment member (26') configured to adjust the torque between the movable arm and the offset device.

2. A drive apparatus according to claim 1, wherein the hub includes a disk shell (111) mounted on the central shaft, the offset means is fixed on the central shaft, the transmission means including a friction wheel (44') driven by the output shaft, the drive motor being accommodated in the offset device in engagement with the disk shell via the output shaft and the friction wheel.

* * * * *